(12) United States Patent
Sippel et al.

(10) Patent No.: US 10,963,649 B1
(45) Date of Patent: Mar. 30, 2021

(54) APPLIED ARTIFICIAL INTELLIGENCE TECHNOLOGY FOR NARRATIVE GENERATION USING AN INVOCABLE ANALYSIS SERVICE AND CONFIGURATION-DRIVEN ANALYTICS

(71) Applicant: Narrative Science Inc., Chicago, IL (US)

(72) Inventors: Alexander Rudolf Sippel, Chicago, IL (US); Bo He, Chicago, IL (US); Nathan William Krapf, Chicago, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 16 days.

(21) Appl. No.: 16/235,705

(22) Filed: Dec. 28, 2018

Related U.S. Application Data

(60) Provisional application No. 62/618,249, filed on Jan. 17, 2018.

(51) Int. Cl.
*G06F 40/56* (2020.01)
*G06F 16/248* (2019.01)
(Continued)

(52) U.S. Cl.
CPC ............ *G06F 40/56* (2020.01); *G06F 16/248* (2019.01); *G06F 16/287* (2019.01);
(Continued)

(58) Field of Classification Search
CPC ................................. G06F 40/30; G06F 40/56
See application file for complete search history.

(56) References Cited

U.S. PATENT DOCUMENTS

| | | |
|---|---|---|
| 4,992,939 A | 2/1991 | Tyler |
| 5,619,631 A | 4/1997 | Schott |

(Continued)

FOREIGN PATENT DOCUMENTS

| | | |
|---|---|---|
| WO | 9630844 A1 | 10/1996 |
| WO | 2006122329 A2 | 11/2006 |

(Continued)

OTHER PUBLICATIONS

Mahamood, Saad, William Bradshaw, and Ehud Reiter. "Generating annotated graphs using the nlg pipeline architecture." Proceedings of the 8th International Natural Language Generation Conference (INLG). 2014. (Year: 2014).*

(Continued)

*Primary Examiner* — Jialong He
(74) *Attorney, Agent, or Firm* — Thompson Coburn LLP

(57) ABSTRACT

Disclosed herein are example embodiments of an improved narrative generation system where an analysis service that executes data analysis logic that supports story generation can include configuration-driven analytics, such as at least one of a configuration-driven peaks analytic, a configuration-driven jumps analytic, a configuration-driven runs analytic, and/or a configuration-driven streaks analytic. In an example embodiment, the analysis service can be segregated from an authoring service that executes authoring logic for story generation through an interface. Accordingly, when the authoring service needs analysis from the analysis service, it can invoke the analysis service through the interface. By exposing the analysis service to the authoring service through the shared interface, the details of the logic underlying the analysis service are shielded from the authoring service (and vice versa where the details of the authoring service are shielded from the analysis service). Through parameterization of operating variables, the analysis service (Continued)

can thus be designed as a generalized data analysis service that can operate in a number of different content verticals with respect to a variety of different story types.

39 Claims, 19 Drawing Sheets

(51) Int. Cl.
  *G06F 16/908* (2019.01)
  *G06F 16/28* (2019.01)
  *G06N 7/00* (2006.01)
  *G06F 40/20* (2020.01)

(52) U.S. Cl.
  CPC .......... *G06F 16/908* (2019.01); *G06F 40/20* (2020.01); *G06N 7/00* (2013.01)

(56) References Cited

U.S. PATENT DOCUMENTS

| | | |
|---|---|---|
| 5,734,916 A | 3/1998 | Greenfield et al. |
| 5,794,050 A | 8/1998 | Dahlgren et al. |
| 5,802,495 A | 9/1998 | Goltra |
| 6,006,175 A | 12/1999 | Holzrichter |
| 6,144,938 A | 11/2000 | Surace et al. |
| 6,278,967 B1 | 8/2001 | Akers et al. |
| 6,289,363 B1 | 9/2001 | Consolatti et al. |
| 6,665,666 B1 | 12/2003 | Brown et al. |
| 6,757,362 B1 | 6/2004 | Cooper et al. |
| 6,771,290 B1 | 8/2004 | Hoyle |
| 6,917,936 B2 | 7/2005 | Cancedda |
| 6,968,316 B1 | 11/2005 | Hamilton |
| 6,976,031 B1 | 12/2005 | Toupal et al. |
| 7,027,974 B1 | 4/2006 | Busch et al. |
| 7,246,315 B1 | 7/2007 | Andrieu et al. |
| 7,324,936 B2 | 1/2008 | Saldanha et al. |
| 7,333,967 B1 | 2/2008 | Bringsjord et al. |
| 7,496,621 B2 | 2/2009 | Pan et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,825,929 B2 | 11/2010 | Kincaid |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 7,930,169 B2 | 4/2011 | Billerey-Mosier |
| 8,046,226 B2 | 10/2011 | Soble et al. |
| 8,311,863 B1 | 11/2012 | Kemp |
| 8,355,903 B1 | 1/2013 | Birnbaum et al. |
| 8,374,848 B1 | 2/2013 | Birnbaum et al. |
| 8,442,940 B1 | 5/2013 | Faletti et al. |
| 8,447,604 B1 | 5/2013 | Chang |
| 8,463,695 B2 | 6/2013 | Schiller |
| 8,468,244 B2 | 6/2013 | Redlich et al. |
| 8,494,944 B2 | 7/2013 | Schiller |
| 8,515,737 B2 | 8/2013 | Allen |
| 8,612,208 B2 | 12/2013 | Cooper et al. |
| 8,630,844 B1 | 1/2014 | Nichols et al. |
| 8,630,912 B2 | 1/2014 | Seki et al. |
| 8,630,919 B2 | 1/2014 | Baran et al. |
| 8,676,691 B2 | 3/2014 | Schiller |
| 8,688,434 B1 | 4/2014 | Birnbaum et al. |
| 8,752,134 B2 | 6/2014 | Ma et al. |
| 8,762,133 B2 | 6/2014 | Reiter |
| 8,762,134 B2 | 6/2014 | Reiter |
| 8,762,285 B2 | 6/2014 | Davis et al. |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,903,711 B2 | 12/2014 | Lundberg et al. |
| 8,977,953 B1 | 3/2015 | Pierre et al. |
| 9,135,244 B2 | 9/2015 | Reiter |
| 9,164,982 B1 | 10/2015 | Kaeser |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,348,815 B1 | 5/2016 | Estes et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,424,254 B2 | 8/2016 | Howald et al. |
| 9,430,557 B2 | 8/2016 | Bhat et al. |
| 9,460,075 B2 | 10/2016 | Mungi et al. |
| 9,529,795 B2 | 12/2016 | Kondadadi et al. |
| 9,535,902 B1 | 1/2017 | Michalak et al. |
| 9,576,009 B1 | 2/2017 | Hammond et al. |
| 9,697,178 B1 | 7/2017 | Nichols et al. |
| 9,697,192 B1 | 7/2017 | Estes et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,870,629 B2 | 1/2018 | Cardno et al. |
| 9,946,711 B2 | 4/2018 | Reiter et al. |
| 9,971,967 B2 | 5/2018 | Bufe, III et al. |
| 9,977,773 B1 | 5/2018 | Birnbaum et al. |
| 9,990,337 B2 | 6/2018 | Birnbaum et al. |
| 10,019,512 B2 | 7/2018 | Boyle et al. |
| 10,037,377 B2 | 7/2018 | Boyle et al. |
| 10,049,152 B2 | 8/2018 | Ajmera et al. |
| 10,115,108 B1 | 10/2018 | Gendelev et al. |
| 10,162,900 B1 | 12/2018 | Chattenee et al. |
| 10,185,477 B1 | 1/2019 | Paley et al. |
| 10,332,297 B1 | 6/2019 | Vadodaria |
| 10,387,970 B1 | 8/2019 | Wang et al. |
| 10,489,488 B2 | 11/2019 | Birnbaum et al. |
| 10,565,308 B2 | 2/2020 | Reiter |
| 10,621,183 B1 | 4/2020 | Chattenee et al. |
| 10,679,011 B2 | 6/2020 | Galitsky |
| 10,699,079 B1 | 6/2020 | Paley et al. |
| 10,706,236 B1 | 7/2020 | Platt et al. |
| 10,747,823 B1 | 8/2020 | Birnbaum et al. |
| 2002/0046018 A1 | 4/2002 | Marcu et al. |
| 2002/0083025 A1 | 6/2002 | Robarts |
| 2002/0107721 A1 | 8/2002 | Darwent et al. |
| 2003/0004706 A1 | 1/2003 | Yale et al. |
| 2003/0061029 A1 | 3/2003 | Shaket |
| 2003/0182102 A1 | 9/2003 | Corston-Oliver et al. |
| 2003/0216905 A1 | 11/2003 | Chelba et al. |
| 2004/0015342 A1 | 1/2004 | Garst |
| 2004/0034520 A1 | 2/2004 | Langkilde-Geary et al. |
| 2004/0138899 A1 | 7/2004 | Birnbaum |
| 2004/0174397 A1 | 9/2004 | Cereghini et al. |
| 2004/0225651 A1 | 11/2004 | Musgrove et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0033582 A1 | 2/2005 | Gadd et al. |
| 2005/0049852 A1 | 3/2005 | Chao |
| 2005/0125213 A1 | 6/2005 | Chen et al. |
| 2005/0137854 A1 | 6/2005 | Cancedda et al. |
| 2005/0273362 A1 | 12/2005 | Harris et al. |
| 2006/0031182 A1 | 2/2006 | Ryan et al. |
| 2006/0101335 A1 | 5/2006 | Pisciottano |
| 2006/0181531 A1 | 8/2006 | Goldschmidt |
| 2006/0212446 A1 | 9/2006 | Hammond et al. |
| 2006/0218485 A1 | 9/2006 | Blumenthal |
| 2006/0224570 A1 | 10/2006 | Quiroga et al. |
| 2006/0271535 A1 | 11/2006 | Hammond et al. |

(56) References Cited

U.S. PATENT DOCUMENTS

| | | |
|---|---|---|
| 2006/0277168 A1 | 12/2006 | Hammond et al. |
| 2007/0132767 A1 | 6/2007 | Wright et al. |
| 2007/0136657 A1 | 6/2007 | Blumenthal et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2008/0005677 A1 | 1/2008 | Thompson |
| 2008/0140696 A1* | 6/2008 | Mathuria ............... G06F 16/221 |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0083288 A1 | 3/2009 | Ledain et al. |
| 2009/0119584 A1 | 5/2009 | Herbst |
| 2009/0144608 A1 | 6/2009 | Oisel et al. |
| 2009/0144609 A1 | 6/2009 | Liang et al. |
| 2009/0175545 A1 | 7/2009 | Cancedda et al. |
| 2009/0248399 A1 | 10/2009 | Au |
| 2009/0254572 A1 | 10/2009 | Redlich et al. |
| 2010/0146393 A1 | 6/2010 | Land et al. |
| 2010/0161541 A1 | 6/2010 | Covannon et al. |
| 2010/0241620 A1 | 9/2010 | Manister et al. |
| 2010/0250497 A1 | 9/2010 | Redlich et al. |
| 2010/0325107 A1 | 12/2010 | Kenton et al. |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0288852 A1 | 11/2011 | Dymetman et al. |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0310699 A1 | 12/2012 | McKenna et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0144605 A1 | 6/2013 | Brager et al. |
| 2013/0145242 A1 | 6/2013 | Birnbaum et al. |
| 2013/0173285 A1 | 7/2013 | Hyde et al. |
| 2013/0174026 A1 | 7/2013 | Locke |
| 2013/0185049 A1 | 7/2013 | Zhao et al. |
| 2013/0187926 A1 | 7/2013 | Silverstein et al. |
| 2013/0211855 A1 | 8/2013 | Eberle et al. |
| 2013/0238330 A1 | 9/2013 | Casella dos Santos |
| 2013/0246934 A1 | 9/2013 | Wade et al. |
| 2013/0253910 A1 | 9/2013 | Turner et al. |
| 2013/0262092 A1 | 10/2013 | Wasick |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0040312 A1 | 2/2014 | Gorman et al. |
| 2014/0062712 A1 | 3/2014 | Reiter |
| 2014/0075004 A1 | 3/2014 | Van Dusen et al. |
| 2014/0129942 A1 | 5/2014 | Rathod |
| 2014/0134590 A1 | 5/2014 | Hiscock, Jr. |
| 2014/0163962 A1 | 6/2014 | Castelli et al. |
| 2014/0200878 A1 | 7/2014 | Mylonakis et al. |
| 2014/0201202 A1 | 7/2014 | Jones et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0032730 A1 | 1/2015 | Cialdea, Jr. et al. |
| 2015/0049951 A1 | 2/2015 | Chaturvedi et al. |
| 2015/0078232 A1 | 3/2015 | Djinki et al. |
| 2015/0134694 A1 | 5/2015 | Burke et al. |
| 2015/0142704 A1 | 5/2015 | London |
| 2015/0161997 A1 | 6/2015 | Inetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1* | 8/2015 | Reiter ................ G06F 3/04842 715/202 |
| 2015/0261745 A1 | 9/2015 | Song et al. |
| 2015/0268930 A1 | 9/2015 | Lee et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0347400 A1 | 12/2015 | Sripada |
| 2015/0347901 A1 | 12/2015 | Cama et al. |
| 2015/0356967 A1 | 12/2015 | Byron et al. |
| 2015/0363364 A1 | 12/2015 | Sripada |
| 2015/0370778 A1 | 12/2015 | Tremblay et al. |
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley et al. |
| 2016/0103559 A1 | 4/2016 | Maheshwari et al. |
| 2016/0132489 A1 | 5/2016 | Reiter |
| 2016/0140090 A1 | 5/2016 | Dale et al. |
| 2016/0162582 A1 | 6/2016 | Chatterjee et al. |
| 2016/0196491 A1 | 7/2016 | Chandrasekaran et al. |
| 2016/0217133 A1* | 7/2016 | Reiter ..................... G08B 5/22 |
| 2016/0232152 A1 | 8/2016 | Mahamood |
| 2016/0232221 A1 | 8/2016 | McCloskey et al. |
| 2016/0314121 A1 | 10/2016 | Arroyo et al. |
| 2017/0004415 A1 | 1/2017 | Moretti et al. |
| 2017/0006135 A1 | 1/2017 | Siebel et al. |
| 2017/0017897 A1 | 1/2017 | Bugay et al. |
| 2017/0024465 A1 | 1/2017 | Yeh et al. |
| 2017/0026705 A1 | 1/2017 | Yeh et al. |
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0116327 A1 | 4/2017 | Gorelick et al. |
| 2017/0140405 A1 | 5/2017 | Gottemukkala et al. |
| 2017/0185674 A1 | 6/2017 | Tonkin et al. |
| 2017/0199928 A1 | 7/2017 | Zhao et al. |
| 2017/0212671 A1 | 7/2017 | Sathish et al. |
| 2017/0213157 A1 | 7/2017 | Bugay et al. |
| 2017/0228372 A1 | 8/2017 | Moreno et al. |
| 2017/0242886 A1 | 8/2017 | Jolley et al. |
| 2017/0270105 A1 | 9/2017 | Ninan et al. |
| 2017/0293864 A1 | 10/2017 | Oh et al. |
| 2017/0358295 A1 | 12/2017 | Roux et al. |
| 2017/0371856 A1 | 12/2017 | Can et al. |

(56) References Cited

U.S. PATENT DOCUMENTS

| | | |
|---|---|---|
| 2018/0025726 A1 | 1/2018 | Gatti de Bayser et al. |
| 2018/0082184 A1 | 3/2018 | Guo et al. |
| 2018/0114158 A1 | 4/2018 | Foubert et al. |
| 2018/0232443 A1 | 8/2018 | Delgo et al. |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0314689 A1 | 11/2018 | Wang et al. |
| 2019/0042559 A1 | 2/2019 | Allen et al. |
| 2019/0138615 A1 | 5/2019 | Huh et al. |
| 2020/0074310 A1 | 3/2020 | Li et al. |
| 2020/0089735 A1 | 3/2020 | Birnbaum et al. |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stones. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS—1998).

Character Writer Version 3.1, Typing Chimp Software LLC, 2012, screenshots from working program, pp. 1-19.

Cyganiak et al., "RDF 1.1 Concepts and Abstract Syntax", W3C Recommendation, 2014, vol. 25, No. 2.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

EnglisheForums, "Direct Objects, Indirect Objects, Obliques, Dative Movement?", [online] https://www.englishforums.com, published 2007. (Year 2007).

Gaff, A., and Portet, F. (2009). Text content and task performance in the evaluation of a Natural Language Generation System. Proceedings of the Conference on Recent Advances in Natural Language Processing (RANLP—09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. Al Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. And Weal, M. (2009). Investigating a Thematic Approach to Narrative Generation, 2009.

Hunter, J., Freer, Y., Gall, A., Logie, R., McIntosh, ft, van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS—08.

Kittredge, R., and Lavoie, B. (1998). MeteoCogent: A Knowledge-Based Tool for Generating Weather Forecast Texts. In Proceedings of the American Meteorological Society Al Conference (AMS—98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

Mack et al., "A Framework for Metrics in Large Complex Systems", IEEE Aerospace Conference Proceedings, 2004, pp. 3217-3228, vol. 5, doi: 10.1109/AERO .2004.1368127.

McKeown, K., Kukich, K, & Shaw, J. (1994). Practical issues in automatic documentation generation. 4th Conference on Applied Natural Language Processing, Stuttgart, Germany, pp. 7-14.

Meehan, James R., TALE-SPIN. (1977). An Interactive Program that Writes Stories. In Proceedings of the Fifth International Joint Conference on Artificial Intelligence.

*Memorandum Opinion and Order for O2 Media, LLC v. Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by 02 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Write Brothers, 2009, user manual.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.

(56) References Cited

OTHER PUBLICATIONS

Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter E., Sripada, S., Hunter, J., Yu, J., and Davy, I. (2005). Choosing words in computer-generated weather forecasts. Artificial Intelligence, 167:137-169.
Riedl et al., "From Linear Story Generation to Branching Story Graphs", IEEE Computer Graphics and Applications, 2006, pp. 23-31.
Riedl et al., "Narrative Planning: Balancing Plot and Character", Journal of Artificial Intelligence Research, 2010, pp. 217-268, vol. 39.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acerb, A. 2000. Automatically extracting highlights for TV Baseball programs. In Proceedings of the eighth ACM international conference on Multimedia. (Marina del Rey, California, United States). ACM Press, New York, NY 105-115.
Smith, "The Multivariable Method in Singular Perturbation Analysis", SIAM Review, 1975, pp. 221-273, vol. 17, No. 2.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Geo-referenced Data to Text for NLG. Paper presented at Proceedings of the 2007 European Natural Language Generation Workshop (ENLGO7).
Thomas, K., and Sripada, S. (2008). What's in a message? Interpreting Geo-referenced Data for the Visually-impaired. Proceedings of the Int. conference on NLG.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
Office Action for U.S. Appl. No. 16/235,594 dated Jun. 12, 2020.
Office Action for U.S. Appl. No. 16/235,636 dated Jul. 9, 2020.
Office Action for U.S. Appl. No. 16/235,662 dated Jul. 6, 2020.
Response to Office Action for U.S. Appl. No. 16/235,594 dated Jun. 12, 2020.
van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to communicate Time Series Data in the Gas Turbine Domain. In P Chung et al. (Eds) Developments in Applied Artificial Intelligence: Proceedings of IEA/AIE—2003, pp. 379-384. Springer (LNAI 2718).

\* cited by examiner

| Analytic Bucket | Description | Applicable Chart Types |
|---|---|---|
| Segments | Interesting portion(s) of a series (at least 2 periods) where there is a noteworthy movement | Linechart |
| Trendline | Examines if a statistically relevant linear trend can be drawn through a continuous series (OLS) | Linechart |
| Correlation | Statistical level of correlation between series | Linechart, Barchart |
| Volatility | Compare degree of variation between series | Linechart |
| Distribution | Evaluation of the frequency of entities in a collection | Barchart, Piechart, Histogram |
| Clustering | Identification of interesting clusters and outliers | Barchart, Piechart |
| Aggregation | Identify interesting changes between buckets | Histogram |

Figure 4

```
{
    "segments": [
        {
            "name": "positiveRuns",
            "analytic_name": "MaximumRunProperty",
            "calculation_type": "properties",
            "options": {
                "direction": "positive",
                "calculation_name": "maximum_value_run_positive"
            }
        },
        {
            "name": "peaks",
            "analytic_name": "PeaksFeatureFinder",
            "calculation_type": "features",
            "options": {
                "calculation_name": "peaks"
            }
        },
        {
            "name": "streaks",
            "analytic_name": "StreaksFeatureFinder",
            "calculation_type": "features",
            "options": {
                "min_streak_length": 0.1
            }
        }
    ]
}
```

Figure 8A

```
{
  "name": "peaks",
  "analytic_name": "PeaksFeatureFinder",         802b
  "calculation_type": "features",
  "options": {
    "calculation_name": "peaks"
  },
  "relevant_rankings": [
    {                                             822a
      "TopCalculationRanking",
      {
        "filter_value": "Positive",
        "filter_attribute": "sign",
        "as_series": true,
        "compare_strategy": "max",
        "compare_calculation_name": "peaks",
        "compare_attribute": "score",
        "calculation_name": "series_with_largest_positive_peak"
      }
    },
    {                                             822b
      "TopCalculationRanking",
      {
        "filter_value": "Negative",
        "filter_attribute": "sign",
        "as_series": true,
        "compare_strategy": "max",
        "compare_calculation_name": "peaks",
        "compare_attribute": "score",
        "calculation_name": "series_with_largest_negative_peak"
      }
    }
  ]
}
```

APPLIED ARTIFICIAL INTELLIGENCE TECHNOLOGY FOR NARRATIVE GENERATION USING AN INVOCABLE ANALYSIS SERVICE AND CONFIGURATION-DRIVEN ANALYTICS

CROSS-REFERENCE AND PRIORITY CLAIM TO RELATED PATENT APPLICATIONS

This patent application claims priority to U.S. provisional patent application Ser. No. 62/618,249, filed Jan. 17, 2018, and entitled "Applied Artificial Intelligence Technology for Narrative Generation Using an Invocable Analysis Service", the entire disclosure of which is incorporated herein by reference.

This patent application is also related to (1) U.S. patent application Ser. No. 16/235,594, filed this same day, and entitled "Applied Artificial Intelligence Technology for Narrative Generation Using an Invocable Analysis Service", (2) U.S. patent application Ser. No. 16/235,636, filed this same day, and entitled "Applied Artificial Intelligence Technology for Narrative Generation Using an Invocable Analysis Service with Analysis Libraries", and (3) U.S. patent application Ser. No. 16/235,662, filed this same day, and entitled "Applied Artificial Intelligence Technology for Narrative Generation Using an Invocable Analysis Service and Data Re-Organization", the entire disclosures of each of which are incorporated herein by reference.

INTRODUCTION

There is an ever-growing need in the art for improved natural language generation (NLG) technology that harnesses computers to process data sets and automatically generate narrative stories about those data sets. NLG is a subfield of artificial intelligence (AI) concerned with technology that produces language as output on the basis of some input information or structure, in the cases of most interest here, where that input constitutes data about some situation to be analyzed and expressed in natural language. Many NLG systems are known in the art that use template approaches to translate data into text. However, such conventional designs typically suffer from a variety of shortcomings such as constraints on how many data-driven ideas can be communicated per sentence, constraints on variability in word choice, and limited capabilities of analyzing data sets to determine the content that should be presented to a reader.

As technical solutions to these technical problems in the NLG arts, the inventors note that the assignee of the subject patent application has previously developed and commercialized pioneering technology that robustly generates narrative stories from data, of which a commercial embodiment is the QUILL™ narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,198, 9,697,492, 9,720,884, 9,720,899, and 9,977,773; and U.S. patent application Ser. No. 14/211,444 (entitled "Method and System for Configuring Automatic Generation of Narratives from Data", filed Mar. 14, 2014), Ser. No. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), Ser. No. 15/666,151 (entitled "Applied Artificial Intelligence Technology for Interactively Using Narrative Analytics to Focus and Control Visualizations of Data", filed Aug. 1, 2017), Ser. No. 15/666,168 (entitled "Applied Artificial Intelligence Technology for Evaluating Drivers of Data Presented in Visualizations", filed Aug. 1, 2017), Ser. No. 15/666,192 (entitled "Applied Artificial Intelligence Technology for Selective Control over Narrative Generation from Visualizations of Data", filed Aug. 1, 2017), 62/458,460 (entitled "Interactive and Conversational Data Exploration", filed Feb. 13, 2017), Ser. No. 15/895,800 (entitled "Interactive and Conversational Data Exploration", filed Feb. 13, 2018), 62/460,349 (entitled "Applied Artificial Intelligence Technology for Performing Natural Language Generation (NLG) Using Composable Communication Goals and Ontologies to Generate Narrative Stories", filed Feb. 17, 2017), Ser. No. 15/897,331 (entitled "Applied Artificial Intelligence Technology for Performing Natural Language Generation (NLG) Using Composable Communication Goals and Ontologies to Generate Narrative Stories", filed Feb. 15, 2018), Ser. No. 15/897,350 (entitled "Applied Artificial Intelligence Technology for Determining and Mapping Data Requirements for Narrative Stories to Support Natural Language Generation (NLG) Using Composable Communication Goals", filed Feb. 15, 2018), Ser. No. 15/897,359 (entitled "Applied Artificial Intelligence Technology for Story Outline Formation Using Composable Communication Goals to Support Natural Language Generation (NLG)", filed Feb. 15, 2018), Ser. No. 15/897,364 (entitled "Applied Artificial Intelligence Technology for Runtime Computation of Story Outlines to Support Natural Language Generation (NLG)", filed Feb. 15, 2018), Ser. No. 15/897,373 (entitled "Applied Artificial Intelligence Technology for Ontology Building to Support Natural Language Generation (NLG) Using Composable Communication Goals", filed Feb. 15, 2018), Ser. No. 15/897,381 (entitled "Applied Artificial Intelligence Technology for Interactive Story Editing to Support Natural Language Generation (NLG)", filed Feb. 15, 2018), 62/539,832 (entitled "Applied Artificial Intelligence Technology for Narrative Generation Based on Analysis Communication Goals", filed Aug. 1, 2017), Ser. No. 16/047,800 (entitled "Applied Artificial Intelligence Technology for Narrative Generation Based on Analysis Communication Goals", filed Jul. 27, 2018), Ser. No. 16/047,837 (entitled "Applied Artificial Intelligence Technology for Narrative Generation Based on a Conditional Outcome Framework", filed Jul. 27, 2018), 62/585,809 (entitled "Applied Artificial Intelligence Technology for Narrative Generation Based on Smart Attributes and Explanation Communication Goals", filed Nov. 14, 2017), 62/632,017 (entitled "Applied Artificial Intelligence Technology for Conversational Inferencing and Interactive Natural Language Generation", filed Feb. 19, 2018), and 62/691,197 (entitled "Applied Artificial Intelligence for Using Natural Language Processing to Train a Natural Language Generation System", filed Jun. 28, 2018); the entire disclosures of each of which are incorporated herein by reference.

The inventors have further extended on this pioneering work with improvements in AI technology as described herein.

For example, the inventors disclose an improvement in narrative generation where an analysis service that executes data analysis logic that supports story generation is segregated from an authoring service that executes authoring logic for story generation through an interface. Accordingly, when the authoring service needs analysis from the analysis service, it can invoke the analysis service through the interface. By exposing the analysis service to the authoring service through the shared interface, the details of the logic underlying the analysis service are shielded from the authoring service (and vice versa where the details of the authoring service are shielded from the analysis service). Through parameterization of operating variables, the analysis service can thus be designed as a generalized data analysis service that can operate in a number of different content verticals with respect to a variety of different story types. This provides practitioners with more flexibility in building out new analytics as well as enabling dynamic, user-defined content.

The inventors further disclose that the analysis service can also be designed to further segregate generalized data analytics from higher level aspects of analysis via another interface. A plurality of analysis applications can be deployed by the analysis service, where the analysis applications are configured to selectively organize and invoke the execution of the lower level analytics. These analysis applications can be selected and instantiated as a function of a parameter in an analysis request from the authoring service and/or at least a portion of the structured data about which a narrative story is to be generated. The lower level analytics are then selectively parameterized and invoked by the selected analysis application. In this way, the lower level analytics can be further shielded from the particulars of a given story request and the higher level analysis applications can be tailored as a function of such particulars. This allows for further flexibility in using and re-using analytics across a variety of different use cases. For example, a practitioner can bundle different combinations analytics together for different story contexts, and the analysis applications can be the component that ties the analytics bundles to different story contexts.

For example, in an example embodiment where a narrative generation system is used to generate narrative stories about structured data from visualizations (e.g., chart data), a practitioner may want different types of narrative stories to be generated for different types of charts. As part of this, a practitioner might decide that, say, Analytics 1, 3, and 5 are useful when generating a narrative story from a line chart, that Analytics 1, 2, and 3 are useful when generating a narrative story from a bar chart, and that Analytics 2, 4, and 5 are useful when generating a narrative story from a histogram. The practitioner can tie different analysis applications to the different chart types (Analysis Application 1 for line charts, Analysis Application 2 for bar charts, and Analysis Application 3 for histograms). When the analysis service is invoked via an analysis request from the authoring service, the analysis service can instantiate and execute a particular analysis application based on the content of the analysis request (e.g., instantiating and executing Analysis Application 1 if the analysis request concerns analysis of line chart data). Analysis Application 1 will then organize and invoke, via the another interface, the analytics that are linked to Analysis Application 1. Parameters and data that are needed by the linked analytics can be passed to the linked analytics via the another interface.

The inventors further note that the lower level analytics can be grouped into different analysis libraries, and these analysis libraries can then be linked to the analysis applications as noted above. These libraries can then further insulate the low level analytics from the higher level applications and thus simplify the design of the analysis applications.

The inventors further disclose that the analysis service can process the structured data to be analyzed to generate new views of that structured data. The analytics within the analysis service can then operate on these new views to improve ability of the system to analyze and call out different perspectives in the resulting narrative while still performing the analysis operations in an efficient manner. For example, aggregation views, filter views, and/or pivot views of the structured data may be helpful to improve the breadth and depth of perspectives revealed in a narrative story as a result of the analysis operations performed by the analytics.

Through these and other features, example embodiments of the invention provide significant technical advances in the NLG arts by separating the logic for narrative story generation from the analysis operations that support such narrative story generation. By structuring coordination between an authoring service and an analysis service via an interface, the modularization of the authoring service and the analysis service allows improvements to be made to one (or both) of these services without adversely affecting the other. Similarly, the use of analysis libraries within the analysis service also allows for specific implementations of individual analytics to be modified and improved without needing to update the interface as a whole.

These and other features and advantages of example embodiments will be discussed in greater detail below.

BRIEF DESCRIPTION OF THE DRAWINGS

FIG. 4 shows an example of how different buckets of analytics can be tied to different types of chart data.

FIG. 8A shows an example configuration for a segments analytic.

FIG. 8B shows an example configuration for a peaks analytic.

DETAILED DESCRIPTION OF EXAMPLE EMBODIMENTS

Figure 1:
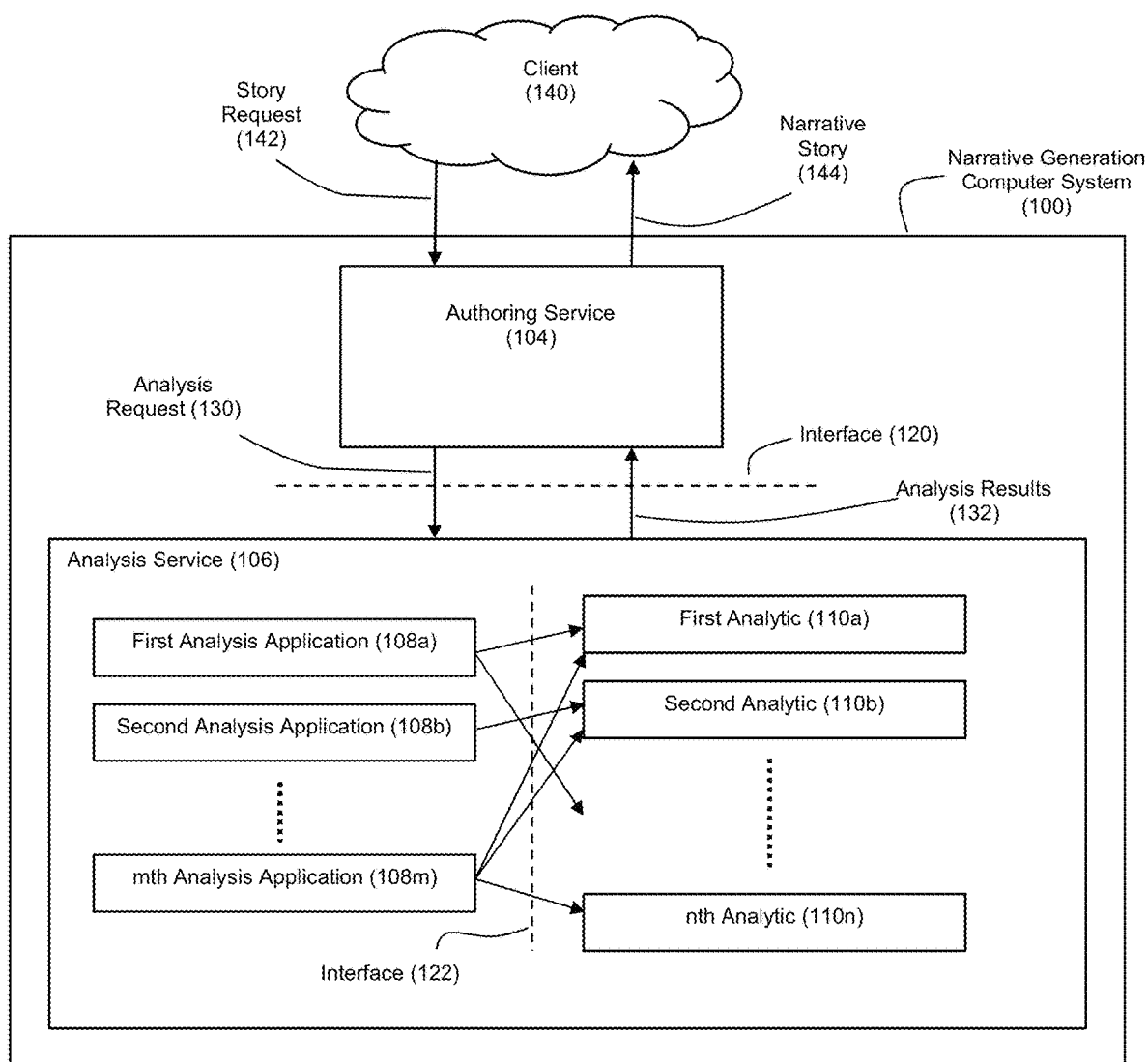
FIG. 1 shows an example narrative generation computer system in accordance with an example embodiment.

FIG. 1 shows an example narrative generation computer system 100 that employs an authoring service 104 and an analysis service 106 that are separated via an interface 120. The narrative generation computer system 100 can generate a narrative story 144 for a client 140 in response to a story request 142 from the client 140. Client 140 can be a client computer that communicates with the narrative generation computer system 100 via a network such as the Internet, although this need not necessarily be the case. For example, client 140 could also be a client application that is executed by the same computer system that executes the authoring service 104 and analysis service 106

The client 140 can provide a story request 142 to the narrative generation computer system 100 to trigger the generation of a narrative story about a data set such as a set of structured data. The story request 142 can include the structured data. It should also be understood that the structured data need not be included in the story request 142. For example, the story request 142 could alternatively identify a location where the narrative generation computer system 100 can access the structured data. The story request 142 can also include metadata about the structured data that will aid the narrative generation computer system 100 with respect to the type of narrative story that is to be generated. For example, if the structured data is chart data, the story request 142 can include metadata that identifies a chart type for the chart data (e.g., a line chart, bar chart, etc.).

The computer system 100 can execute the authoring service 104 to control the generation of narrative story 144 in response to the story request 142. The authoring service 104 can employ techniques such as those described in the above-referenced and incorporated patents and patent applications to generate narrative stories from data. In these examples, the narrative generation computer system 100 can employ one or more story configurations that specify a narrative structure for desired narrative stories while also specifying parameters that address how the content for such narrative stories is determined.

To support narrative generation in this fashion, the narrative generation computer system 100 will have a need for processing the structured data to generate metadata about the structured data, where such metadata provides the system with further insights about the structured data. As examples, the above-referenced and incorporated patents and patent applications describe various embodiments wherein elements such as derived features, angles, and data characterizations are generated from structured data to support intelligent story generation. For example, if the structured data is a line chart of product sales by month over time, some items of metadata that may be desired to support narrative generation may include (1) the average of product sales per month, (2) the peak value of monthly product sales, (3) an indication as to the direction of product sales over the time period in question (e.g., steadily rising, steadily declining, relatively consistent, highly volatile, etc.) This information serves as metadata about the structured data, and the narrative generation computer system 100 can employ the analysis service 106 to generate such metadata.

Interface 120 serves to modularize the analysis service 106 relative to the authoring service 104, which provides a benefit of shielding the details of the analysis service from the authoring service and vice versa. The authoring service 104 can invoke the analysis service by sending an analysis request 130 to the analysis service 106 via interface 120. This analysis request 130 can be a structured message that includes parameters used to focus and control the analysis operations that are to be performed on the structured data by the analysis service 106. The analysis service 106 then processes the structured data based on parameters in the analysis request 130 to generate desired metadata about the structured data. This metadata can then be returned to the authoring service 104 through interface 120 as analysis results 132.

The authoring service 104 can the use the metadata within the analysis results 132 to support narrative generation in a manner such that the narrative story 144 includes one or more insights about the structured data based on the metadata from the analysis service 106.

The analysis service 106 can also be a multi-layered service where a plurality of analysis applications can selectively invoke any of a plurality of analytics 110 via interface 122. Interface 122 serves to modularize the analytics 110 relative to analysis applications 108, which provides a benefit of shielding the details of the analysis applications from the analytics and vice versa. For example, the analysis applications 108 that are selected and executed with respect to a given analysis request 130 can be context-dependent on the nature of the structured data. By contrast, the analytics 110 can be parameterized so that the logic for the analytics is independent of any specific context with respect to the structured data.

Thus, in an example embodiment, a practitioner may want a first set of analytics 110 to be performed when the structured data is of a first type (e.g., if the structured data corresponds to a line chart) and also want a second set of analytics 110 to be performed when the structured data is of a second type (e.g., if the structured data corresponds to a bar chart). The analysis applications 108 can shield the analytics from such context. With reference to the example of FIG. 1, a first analysis application 108a can be linked to first analytic 110a, and another analytic, a second analysis application 108b can be linked to second analytic 110b, and so on until an mth analysis application 108m is linked to the first analytic 110a, the second analytic 110b, and an nth analytic 110n. In this way, the analysis applications selectively invoke and parameterize the desired analytics as a function of the analysis request, and the analytics 110 themselves need not have any conception of the higher level aspects of narrative generation beyond the parameters that are passed to them via interface 122.

Figure 2A:
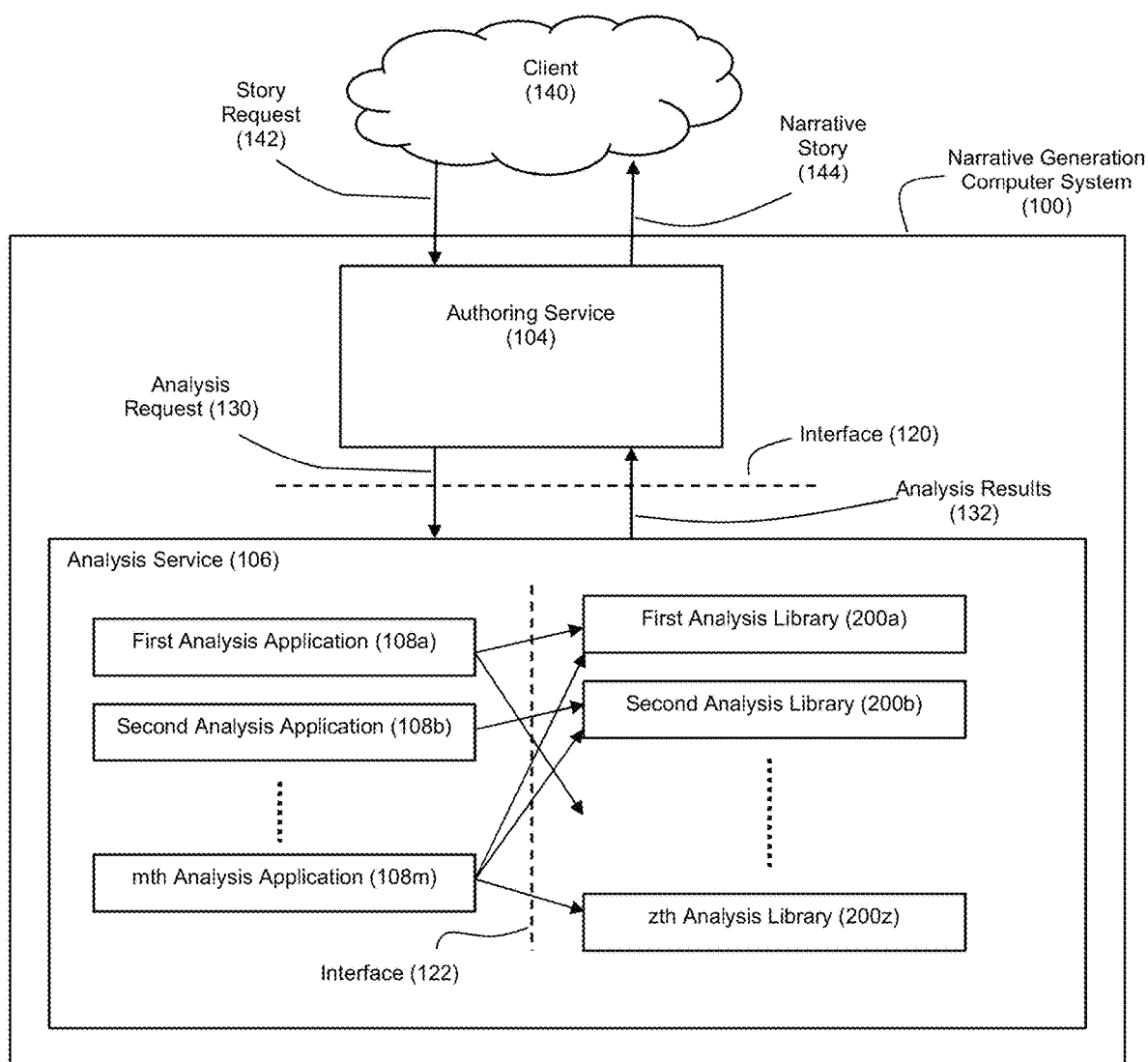
FIG. 2A shows an example narrative generation computer system in accordance with another example embodiment.
Figure 2B:
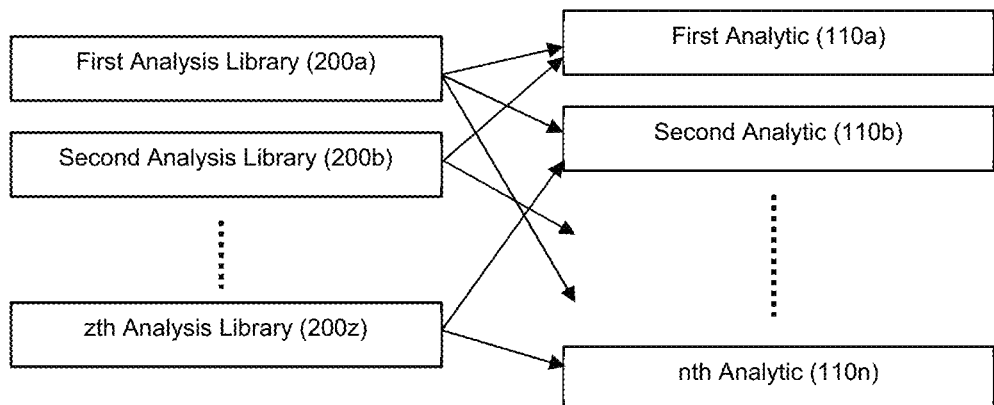
FIG. 2B shows an example of how various analytics can be grouped into various analysis libraries.

Furthermore, if desired by a practitioner, analytics 110 can be linked to analysis applications indirectly via analysis libraries 200 as shown in FIGS. 2A and 2B. An analysis library 200 can be a grouping of one or more analytics 110, and the analysis applications can selectively invoke and parameterize the analysis libraries 200 via interface 122. With reference to the example of FIG. 2A, a first analysis application 108a can be linked to first analysis library 200a, and another analysis library, a second analysis application 108b can be linked to second analysis library 200b, and so on until an mth analysis application 108m is linked to the first analysis library 200a, the second analysis library 200b, and an zth analysis library 200z. The various analysis libraries 200 can then group different analytics 110 together in any of a number of combinations. For example, FIG. 2B shows that a first analysis library 200a can be linked to first analytic 110a, and another analytic, a second analysis library 200b can be linked to second analytic 110b, and so on until a zth analysis library 200z is linked to the first analytic 110a, the second analytic 110b, and an nth analytic 110n.

Figure 3:
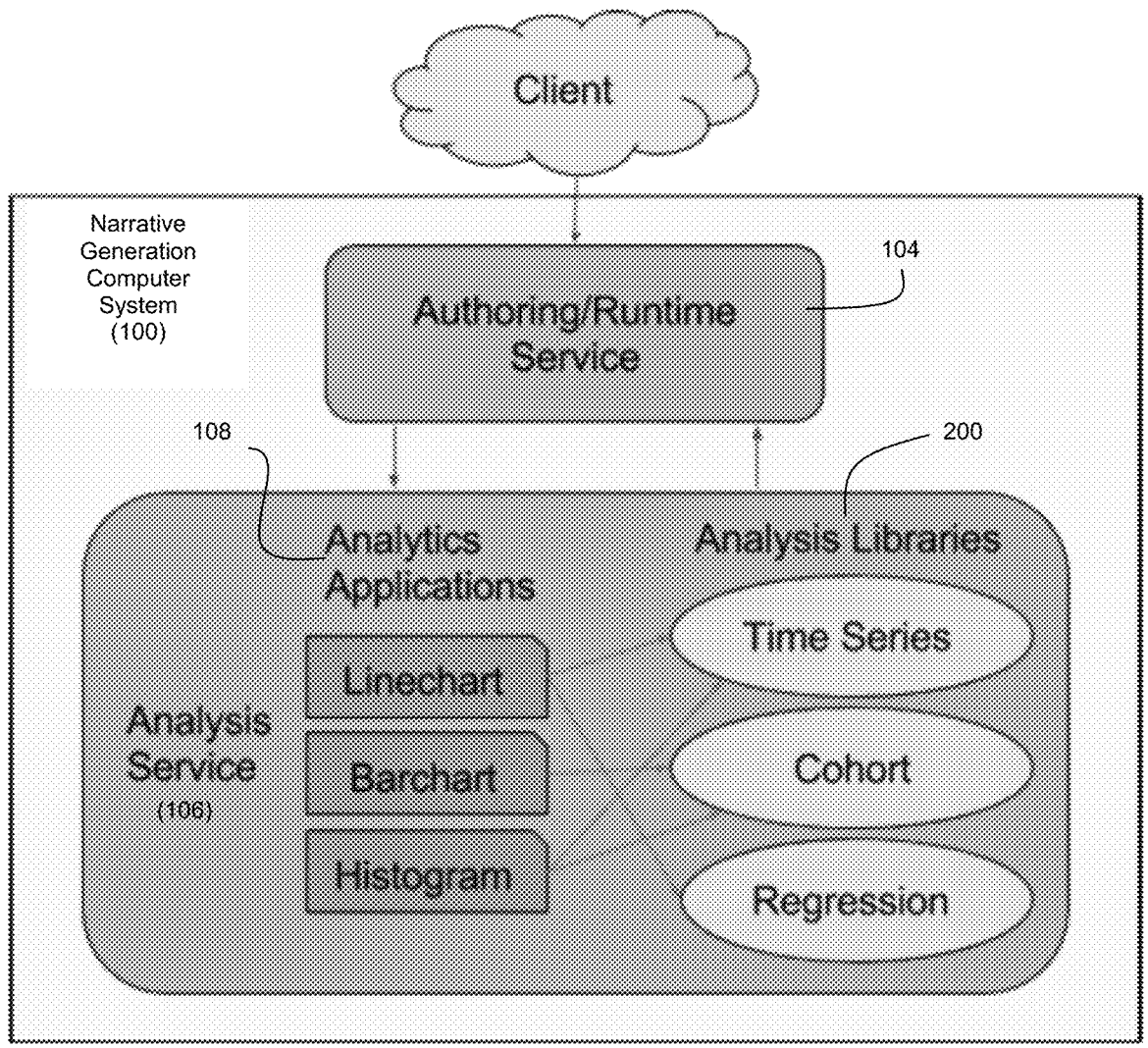
FIG. 3 shows an example narrative generation computer system in accordance with yet another example embodiment.

FIG. 3 shows an example embodiment of FIG. 2A where the analysis service 106 includes analysis applications 108 that are tailored to different chart types with respect to the structured data. For example, (1) line charts can trigger the analysis service to select a line chart analysis application which is linked to specific analysis libraries such as a time series analysis library and a regression analysis library, (2) bar charts can trigger the analysis service to select a bar chart analysis application which is linked to a specific analysis library such as a cohort analysis library, and (3) histograms can trigger the analysis service to select a histogram analysis application which is linked to specific analysis libraries such as the time series analysis library and the cohort analysis library. As an example, FIG. 4 shows examples of different analytics that a practitioner may want to link to different chart types, together with a description for those analytics. A practitioner can then bundle these different analytics into different analysis libraries as shown by FIG. 2B to define a desired set of analytics to be run when certain chart types are found in the structured data.

Figure 5:
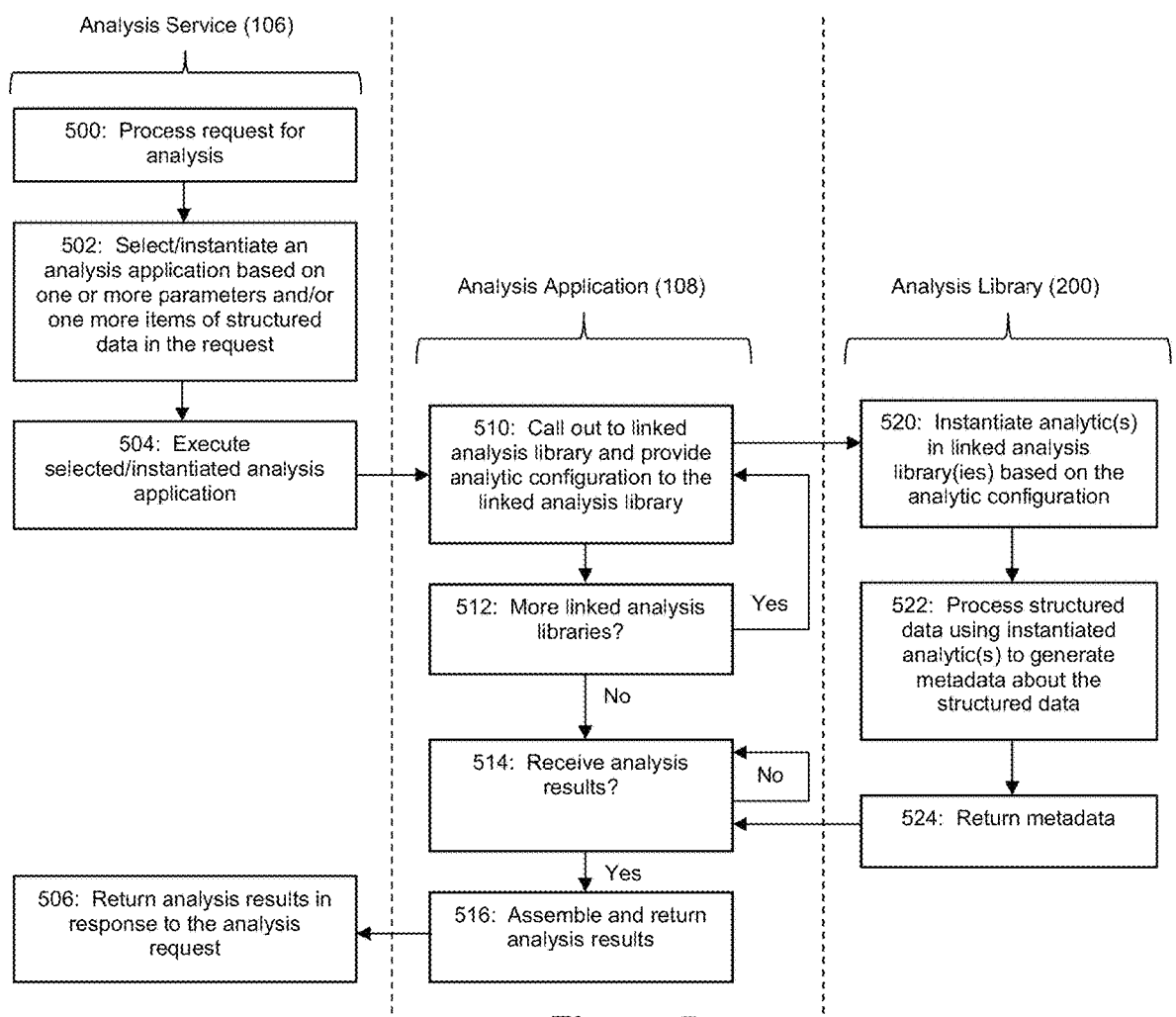
FIG. 5 shows an example process flow for analysis operations within an example embodiment of the analysis service.

FIG. 5 shows an example process flow for an analysis service 106 with respect to the examples of FIGS. 2A and 2B as well as FIG. 3. At step 500, the analysis service 106 processes an analysis request 130 received from the authoring service 104 via interface 120. In an example embodiment, the analysis service 106 can be configured as a web service that responds to analysis requests 130 that, for example, can take the form of HTTP requests from authoring service 104. Such an analysis request 130 can include an unmodified JSON payload that was sent by client 140 to the system 100 as a story request 142. This JSON payload can contain all of the structured data to be considered by system 100. For example, if the system 100 is being used to generate narrative stories about data visualizations, the payload can include all of the data that supports the subject visualization (which may include visualization metadata such as an identification of a visualization type, e.g., line chart, bar chart, etc.). The JSON payload can also include configuration data used for story writing and analytics (e.g., authoring, analytics, drivers, relationships, etc.).

At step 502, the analysis service 106 selects and instantiates an analysis application 108 based on one or more parameters and/or one or more items of structured data in the processed request 130. For example, the analysis service 106 may map a parameter of the request 130 (such as chart type) to a particular analysis application 108. In doing so, the analysis service can build and resolve an analytic configuration based on parameters in the request 130 and any defaults defined by the relevant analysis application 108. This analytic configuration can specify which analytics are to be run and which parameters are to be used in the running of those analytics. In the context of FIGS. 2A and 3, this analytic configuration can specify which analysis libraries 200 are to be invoked, and the analytic configuration may also specify an order of precedence for the analysis libraries that are to be invoked.

Figure 6:
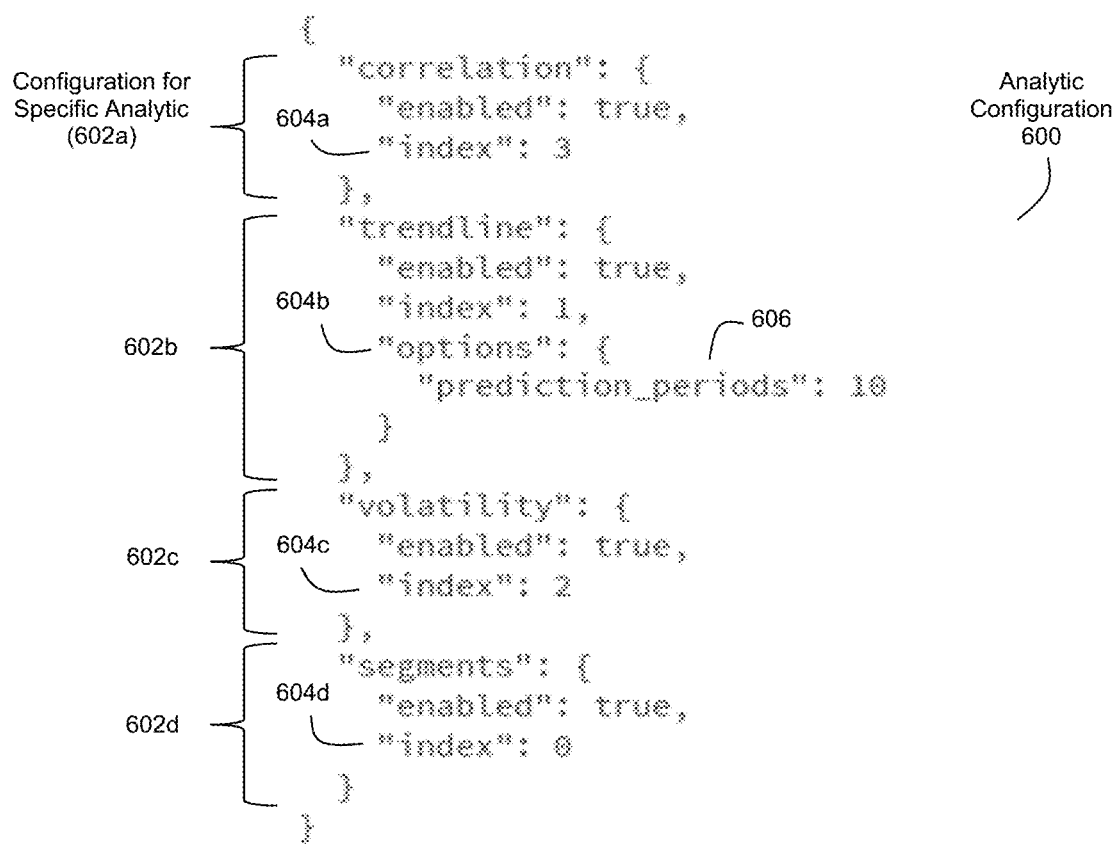
FIG. 6 shows an example analytic configuration for an analysis application.

FIG. 6 shows an example analytic configuration 600 that can be resolved by the analysis service at step 502 In this example, with reference to FIG. 4, the analysis request 130 will include a parameter that identifies the subject structured data as comprising line chart data. Accordingly, analysis libraries will be invoked that include analytic buckets for segments analysis, trendline analysis, correlation analysis, and volatility analysis. It should be understood that the analytic buckets may include more than one underlying analytic. Accordingly, the analytic configuration 600 will include configurations for specific analyses such as a correlation configuration 602a, a trendline configuration 602b, a volatility configuration 602c, and a segments configuration 602d. Each specific analysis configuration can include a parameter that identifies the corresponding analytic or analytic bucket as enabled as well as an index parameter 604 that identifies an order of precedence for the corresponding analytic or analytic bucket relative to the other enabled analytics or analytic buckets. In this example, it can be seen that index parameter 604d identifies the segments analytic bucket as having the highest order of precedence, followed by the trendline analytic bucket (see index parameter 604b), followed by the volatility analytic bucket (see index parameter 604c), followed by the correlation analytic bucket (see index parameter 604a). The order of precedence associated with an analytic can identify an order in which the results of running that analytic are to be expressed in an output narrative. For example, if a streaks configuration has a lower order of precedence than a peaks configuration (and there are valid streaks in the data), then the output narrative would mention streaks-related content before that of peaks (presuming there are peaks in the data).

The analytic configuration 600 can also include specific parameters and/or thresholds to consider for the different specified analytics. For example, to control the trendline analytic bucket, the trendline configuration 604b can include a parameter 606 that specifies how many prediction periods are to be used in the trendline analysis. The value for this parameter can be passed through via analysis request 130 or it can be defined as a default setting by the analysis service. Thus, it should be understood that user or author preferences for thresholds and the like can be included in the analysis request 130 and applied directly by the analysis service 106 to each of the underlying analytic buckets via a mapping of parameters. This means that when a user or author selects, for example, an inclusion threshold of 0.4 for the segments analysis, any streaks or peaks (which are specific analytics that can be performed as part of segments analytic bucket) that do not exceed a 40% change will be disregarded and not returned in the analysis results 132.

By separating the underlying analytics from the user-driven and/or author-driven configuration in this way, significant flexibility is provided to practitioners for building out new analytics as well as enabling a dynamic and user-defined and/or author-defined content. Engineers can easily prototype as well as selectively enable/disable analytics by updating how analytic buckets are mapped to specific analytics without disrupting user workflows or modifying extensions.

Returning to FIG. 5, at step 504, the selected and instantiated analysis application is executed. The analysis applications 108 can be Python classes which coordinate the ingestion, manipulation and analysis of the structured data. With respect the example of FIG. 4, roughly one analysis application 108 can exist for each chart type supported by system 100, although it should be understood that a practitioner might choose to employ alternate arrangements. For example, a practitioner might choose to have pie charts and bar charts share the same analysis application 108. As another example, a practitioner may want to run different analytics for a single dimensional line chart as compared to a multi-dimensional line chart, in which case the mapping of analysis applications 108 to chart types can take into consideration more than just the high level chart type. The analysis application classes can be configured with knowledge of how to ingest data as well as call out to the generalized analysis libraries 200 that will perform the actual analysis (see steps 510-512). The analysis application 108 will also receive the analysis result(s) 132 from the analysis libraries 200 (step 514) as well as assemble and return the analysis results (step 516) for ultimate delivery to the authoring service 104 (step 506). Steps 516 and/or 506 can include serializing the results and performing transforms on the results to make them understandable to the authoring service 104. As an example, the transforms may convert references in the results from being index-based (e.g., the streak starts at the third dimension value) to being identifier-based (e.g., the third dimension value has an identifier of "d3"). Such a transform can make it easier for the authoring service to find and cache certain values (rather than forcing the authoring service to look through a list of values each time that the value is needed). Such a conversion transformation can be performed by looking through each of the analytic result objects for certain field names (e.g., 'start_index' or 'index') and replacing the value on that field with the associated dimension value's identifier (e.g., 'd3' or "dimnension_val_10').

Each of the analysis application classes can inherit from a base class and thus share a significant amount of logic, particularly with respect to ingestion and high level aspects of the workflow. An area where the analysis application classes may differ is with respect to transform logic as well as in the decisions around which analysis libraries 200 they call out to with which subsets of the structured data.

Which analysis library 200 gets chosen at step 510 can depend on the types of structured data to be analyzed as well as the analytics specified by analytic configuration 600. Some analytics do not lend themselves to analyzing data that does not meet certain criteria. For example, continuity criteria can play a role in deciding whether a peaks analytic should be performed. If the subject data is organized along some form of a continuity basis (e.g., by time), then it may make sense to look for peaks in the data. However, if the data is completely unordered, then the peaks may be deemed arbitrary since the order in the data is arbitrary. Also, some data types and visualizations may have an assumed intent that indicates whether a given analytic would be helpful. An example of this would be where the act of making a line chart implies there is a desire to look at or see trends in the data; hence it makes sense to call out to a time series analysis library if the structured data to be analyzed includes a line chart. Continuing with the examples of FIGS. 3-4, if a line chart story is requested, the time series analysis library 200 can be used to find segments, perform trendline analysis, etc. If drivers are configured for this run, then in addition to the time series analysis library, the regression analysis library 200 can also be called on to run a multivariate regression and assess the model's validity. Similarly, if a histogram story is requested, the cohort analysis library can be called to find outliers/clusters while the time series analysis library will determine the largest jump between histogram bins.

In the case of multi-dimensional structured data, the analysis application 108 can also decide how to split up the multi-dimensional data into new organizations of data which are more amenable to analysis by the specified analytics. These new organizations of the data can help the system find and express more relevant information in a narrative in an efficient manner. By breaking up source multi-dimensional data and analyzing the various pieces independently, the system has a greater ability to efficiently compare and contrast the results to develop a richer and more nuanced story.

Figures 7A, 7B:
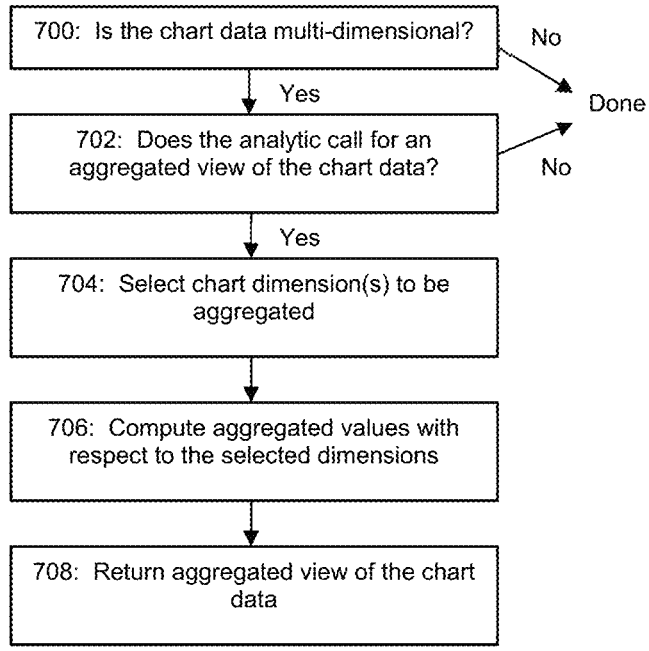
FIG. 7A shows an example process flow for generating an aggregation view of chart data.
FIG. 7B shows example chart data and an example aggregation view produced from such chart data.

For example, the specified analytics may operate to provide more relevant information in a narrative in an efficient manner if they are provided with an aggregated view (or aggregated views) of multi-dimensional chart data. FIG. 7A depicts an example process flow that can be executed to create such an aggregated view of multi-dimensional chart data. Step 700 checks the chart data to see if it is multi-dimensional. If so, step 702 checks to see if a specified analytic would benefit from receiving an aggregated view of the multi-dimensional chart data. If so, step 704 selects the chart dimension(s) to be aggregated. Then, step 706 computes aggregated values with respect to the selected dimension(s). The computed aggregated values are then used to populate a table with an aggregated view of the subject chart data (see step 708). FIG. 7B shows an example of an aggregated view created from a multi-dimensional table with a region dimension, a product dimension, and a monetary sales amount dimension. In this example, the product group dimension is aggregated to produce a regional sales aggregated view where the sales amounts for different product groups in the same regions are aggregated together as shown in FIG. 7B.

Figures 7C, 7D:
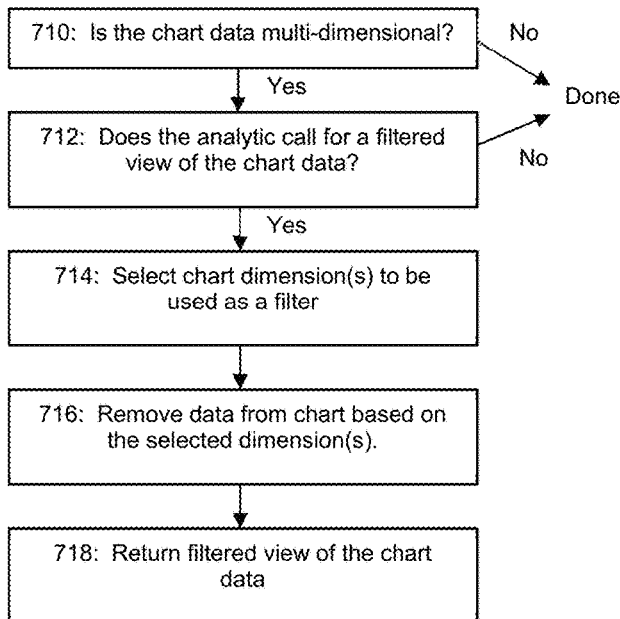
FIG. 7C shows an example process flow for generating a filter view of chart data.
FIG. 7D shows example chart data and an example filter view produced from such chart data.

As another example, the specified analytics may operate to provide more relevant information in a narrative in an efficient manner if they are provided with a filtered view (or filtered views) of multi-dimensional chart data. This filtered view can also be referred to as a drilldown view. FIG. 7C depicts an example process flow that can be executed to create such a filtered view of multi-dimensional chart data. Step 710 checks the chart data to see if it is multi-dimensional. If so, step 712 checks to see if a specified analytic would benefit from receiving a filtered view of the multi-dimensional chart data. If so, step 704 selects the chart dimension(s) to be filtered, and data is then removed from the chart based on the selected dimension(s) (step 716). Then, step 718 returns a table with the filtered view of the subject chart data. FIG. 7D shows an example of a filtered view created from a multi-dimensional table with a region dimension, a product dimension, and a monetary sales amount dimension. In this example, a filter view of central region sales is desired, which results in the removal of the chart rows corresponding to the western and southern regions as well as removal of the region column given that all of the data in the filtered chart view pertains to the central region.

Figure 7E:
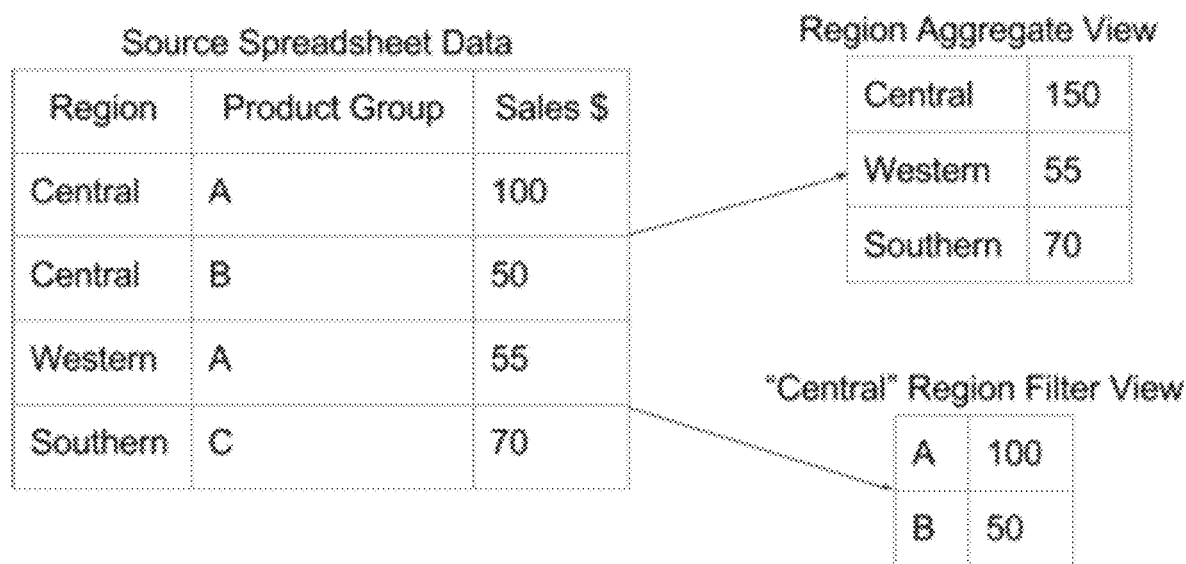
FIG. 7E shows example chart data with example aggregation and filter views produced from such chart data.

It should also be understood that the process flows of FIGS. 7A and 7C could be performed in tandem if desired. For example, in a multi-dimensional bar chart run, the analytics application 108 can specify performance of cohort analysis on both a top-level aggregated view of the bar chart data as well as each of a plurality of drilldown views (e.g., sales by region as well as the sales by product in each region). If so, the analysis application can produce both an aggregated view and a filtered view of the chart data for use by the analytics, as shown in FIG. 7E. This would allow analytics to process both the region aggregated view as well as the central region filtered view.

Figures 7F, 7G:
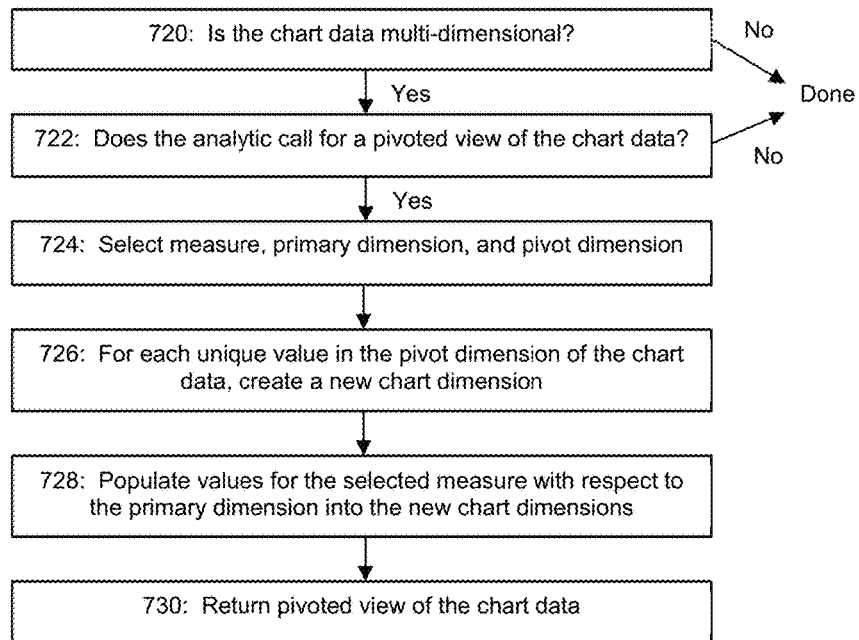
FIG. 7F shows an example process flow for generating a pivot view of chart data.
FIG. 7G shows example chart data and an example pivot view produced from such chart data.

As yet another example, the specified analytics may operate to provide more relevant information in a narrative in an efficient manner if they are provided with a pivoted view (or pivoted views) of multi-dimensional chart data. FIG. 7F depicts an example process flow that can be executed to create such a pivot view of multi-dimensional chart data. Step 720 checks the chart data to see if it is multi-dimensional. If so, step 722 checks to see if a specified analytic would benefit from receiving a pivot view of the multi-dimensional chart data. If so, step 724 selects the measure, primary dimension, and the pivot dimension to be used as part of the pivot operation. Then, step 726 creates a new chart dimension for each unique value in the selected pivot dimension. Next, step 728 populates the values of the selected measure with respect to the selected primary measure into the new chart dimensions. Then, step 730 returns the populated table as the pivot view of the chart data. FIG. 7G shows an example of a pivot view created from a multi-dimensional table with columns for year/month, division, revenue, and sales. In this example, the year month column is used as the primary dimension, the division column is used as the pivot dimension, and the sales column is used as the measure. This results in the pivot view having columns for the two unique values in the pivot dimension (domestic and international) such that the pivot view of sales by division over time appears as shown in FIG. 7G.

Returning to FIG. 5, at step 510, the selected analysis application 108 invokes an analysis library 200 specified by the analytic configuration 600 via interface 122. As previously mentioned, the underlying analytics that power the analysis service 106 can make use of generalized analysis libraries 200 that group together several categories of analytics to achieve a desired purpose. Whereas analysis applications 108 have a notion of chart types and or other higher level aspects relating to the narrative purpose of the narrative generation process, the analysis libraries 200 can be designed to provide a configuration-driven framework for performing computations regardless of a particular context.

At step 520, an invoked analysis library 200 instantiates the one or more analytics within the subject library 200 based on a configuration passed to the library 200 through interface 122. Through the interface 122, the invoked analysis library 200 can receive a data structure (such as a Pandas dataframe) that includes the structured data to be analyzed as well as configuration data for the subject analytics. At step 522, the structured data is processed using the one or more analytics that were instantiated at step 520 to generate analytics-based metadata about the structured data. This metadata is then returned to the analysis application (step 524).

While, for ease of illustration, FIG. 5 shows steps 520-524 being sequentially invoked via a loop between steps 510 and 512, the inventors note that steps 520-524 can be performed in parallel for the different linked analysis libraries if desired by a practitioner. For example, if a processor on which the analysis service runs has multi-processing capabilities, different compute resources can perform steps 520-524 for different linked analysis libraries in parallel with each other (e.g., Compute Resource 1 performs steps 520-524 for linked Analysis Library 1 while Compute Resource 2 performs steps 520-524 for linked Analysis Library 2).

FIG. 8A shows an example of configuration data 800 that can be passed to an analysis library 200 via interface 122. This example configuration 800 is for the segments analysis bucket identified in FIG. 4. The segments analysis specifies three underlying analytics, each with their own configuration 802; namely a configuration 802a for a Positive Runs analytic, a configuration 802b for a Peaks analytic, and a configuration 802c for a Streaks analytic. The configurations 802 specify a parameter mapping for various analytic parameters. The "name" and "calculation_type" parameters control where and under what field name on the analysis result model (see 132 in FIG. 1) the calculation results are placed. This can be used by authoring to, for example, discuss all of the "features" in one section, or alternatively by an application developer making use of the analysis service API to have finer-grained control on the output model. The "analytic_name" parameter can be the name of the actual Python class that is to be invoked for the subject analytic (e.g., 110a in FIG. 1). The configurations 802 can also specify option parameters 804 that influence the results returned by the subject analytic. For example, option parameters 804a with respect to the Positive Runs analytic specifies a direction to be referenced for measuring runs and also a name for the calculations produced by the positive runs analytic. The direction field can tell the analytic whether to search for always increasing values (positive), always decreasing values (negative), or values that are flat and not change period-over-period. As another example, option parameters 804b with respect to the Peaks analytic specifies a name for the calculations produced by the peaks analytic. This parameter controls the name of the field to use on the output model for the results of running the "PeaksFeatureFinder" analytic. This could also be used by the authoring service to know where to find that information. As another example, option parameters 804c with respect to the Streaks analytic specifies a minimum streak length to be used for assessing streaks in the structured data. The minimum streak length parameter can have a value that is expressed as a percentage of the total series length. As mentioned, the specified parameters in configuration 800 can be passed into the analysis service via request 130 or defined as a setting by the analysis service 106 (e.g., analysis application 108 having logic that sets a parameter value as a function of content in the analysis request 130).

With reference to the example of FIG. 3, the time series analysis library 200 can be configured to process structured data that is ordered in some way, and the time series analysis library 200 can bundle analytics that lend themselves to describing the relationship of the values in this structured data with respect to such order. The order can be a time order (such as revenue by month), but the order need not necessarily be a time order. Accordingly, it should be understood that a practitioner might find it useful to apply the time series analysis library 200 to structure that is ordered by some criteria other than time (such as cell phone signal strength by distance from cell tower).

A cohort analysis library 200 can be configured to process unordered data. A practitioner may find it useful to bundle statistical analysis tools in a cohort analysis library (such as analytics that find the skew, mean, etc. with respect to unordered data). Also, analytics that find outliers and clusters of values in a data set may be useful to include in a cohort analysis library.

A regression analysis library 200 enables the performance of regressions on data to create and characterize models. As such, a regression analysis library can unify various stages or steps of regression analysis, including data transformation, model fitting, model evaluation, outlier detection, and prediction. A practitioner might find it useful to permit one or more of these stages to be selectively enabled and disabled via configuration settings passed through interface 122.

Analysis libraries 200 can also specify a workflow of underlying analytics that are to be performed. This allows a number of underlying analytics to be considered as a single atomic unit from a developer's perspective by combining several operations together according to a workflow. Such workflows can take what are typically iterative processes and turns them into a linear operation. For example, the 4 operations outlined below (model fitting/sampling, diagnostic testing, model evaluation, and prediction) are conventionally performed by data scientists until the resulting model (which can take the form of a mathematical expression of relationships associated with certain weights) is sufficient. With an example embodiment, the system can perform this series of steps once in that order, obtaining metadata about how the processed proceeded (e.g., which diagnostic tests were performed, how valid the model is, etc.). The results of these workflows can then expose information about what steps were taken and provide additional information that can contribute to describing the output. For example, the information and the resulting model itself can then be used to report on the results of the process in the narrative (an example of which can be seen in the customer service narrative paragraph below). At each of the 4 operations, the system can accumulate metadata about the process for that operation as well as the results of the operation itself. For diagnostic testing, the system can know which tests were performed for that particular analysis as well as the results of those tests. In such an example, and with reference to the customer service narrative paragraph below, the "there may be other factors contributing the Trip Advisor Score" comment may arise from the fact that one of the diagnostic tests indicated as such, and the statement about "evidence of a very strong relationship" can arise from the model evaluation step. By doing a single pass through the 4 operations described below and reporting out data that indicates how well the models worked out, the system can speed up the analysis processed and lower the bar for performing more advanced analysis without having to understand every underlying detail.

As examples, the times series analysis library and the region analysis library may expose a workflow of underlying analytics to developers as a single atomic unit. For example, a trendline analytic in the time series analysis library and a single/multivariate regression analytic in the regression analysis library can bundle a host of checks and statistics by following a process such as (1) model fitting and sampling, (2) diagnostic testing, (3) model evaluation, and (4) prediction (which may include confidence indicators). Information from each step can be expressed in the analysis results 132, which enables the authoring service 104 to produce a narrative story that expresses insights such as the following:

> "As Customer Service increased, TripAdvisor Score increased based on the data provided. Specifically, when Customer Service increased by 10, Trip Advisor Score increased by 3.27. There may be other factors contributing to Trip Advisor Score, but there is evidence of a very strong relationship".

As another example, a periodicity analytic in the time series analysis library, which can be used to find and describe any cyclical behaviors in the structured data, can bundle a series of steps by following a process such as (1) data detrending, (2) periodogram, and (3) white noise bootstrapping (to determine a confidence level). Because the periodicity analytic wants to understand the cyclic nature of values, the bundled steps can help the system understand how often the subject values vary as a function of how often they occur (their frequency). A periodogram, which essentially operates as a histogram here, provides the system with this information by looking at all the values and performing a Fourier Transform on them. The resulting periodogram is then inspected to see at what frequencies the values change the most. As an example, consider a data set that describes ridership of public transportation over time. The frequency information in this would then be to what degree the ridership changes daily, monthly, yearly, etc. The maximum of the transformed data gives the frequency for which the ridership changed the most. The system can then report on those frequencies in the story (saying, for example that the ridership shows cyclicity, adjusting at regular weekly and monthly intervals).

Also, a practitioner may find it useful to include various design patterns and data models within analytics as aids to the story writing process.

Figure 10:
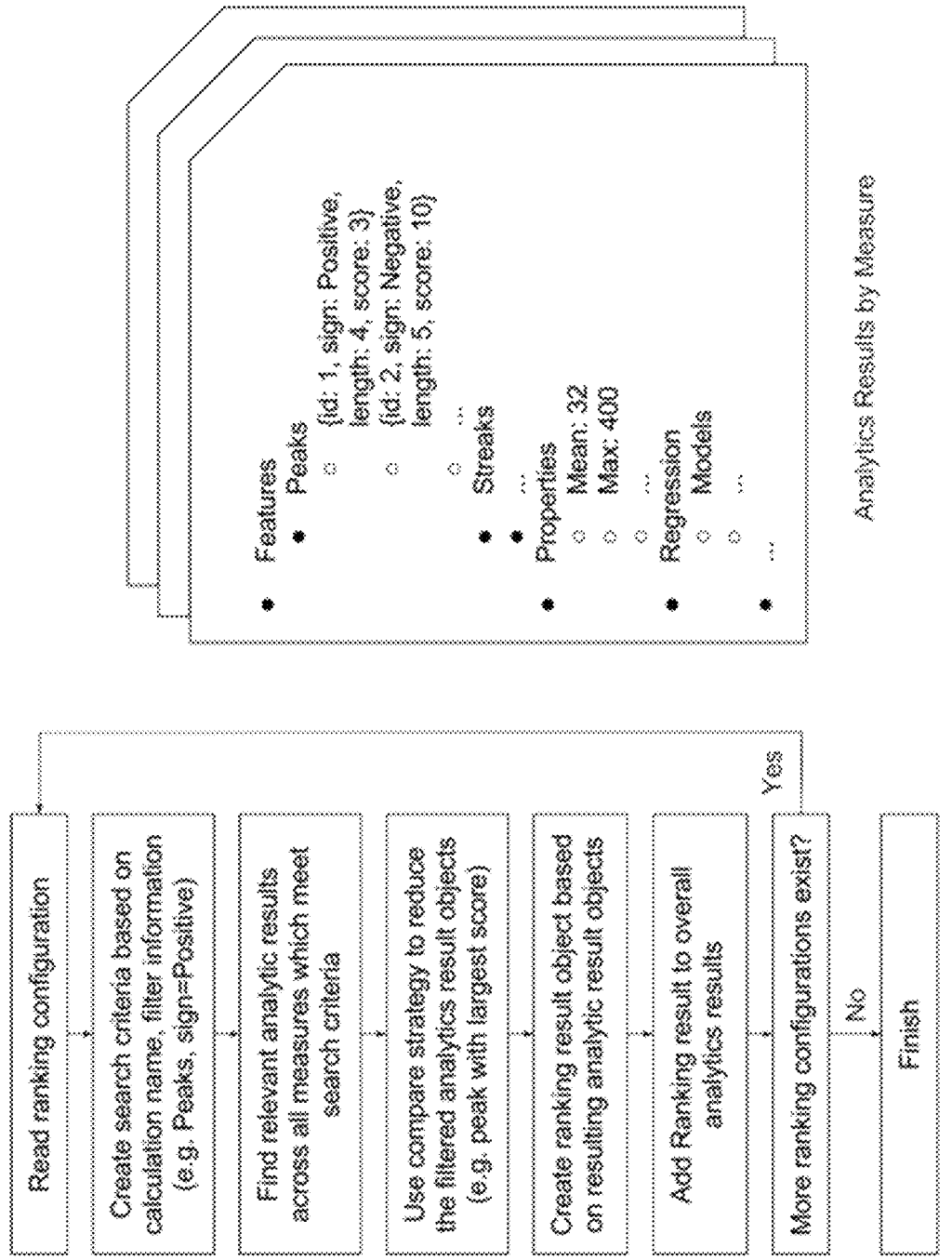
FIG. 10 shows an example process flow for a ranking analytic.

For example, rankings are a type of analytic that can be included as part of analysis library, and a ranking analytic can be configured to find the most interesting or important of previously computed analytics. An example process flow for a ranking analytic is shown by FIG. 10. Such ranking calculations can be performed after such other analytics. For example, a rankings analytic could be employed to find a series with the largest positive peak. Similar to the other analytics, a rankings analytic can be configuration-based, where the configuration describes how to find the relevant analytic (e.g., choosing by "compare_calculation_name") as well as which attribute to look at and compare against (e.g., "compare_attribute" and "compare_strategy", respectively. An example analytic configuration 802b for a peaks analytic that includes a ranking analytic configuration 820 is shown by FIG. 8B. The rankings configuration 820 specifies two types of rankings that are to be produced from the results of the peak finding analytic across the various subject series (e.g., measures) in the data. Configuration 822a specifies how the ranking analytic is to be applied to find the peak within the peak values with the largest positive value. Configuration 822b specifies how the ranking analytic is to be applied to find the peak within the peak values with the largest negative value. Parameters within these configurations 822 specify control values for the ranking process.

For example, the "as_series" parameter describes how to format that ranking's result. If the "as_series" parameter is set to true, it will link to the entire measure that the peak is associated with (which is what this example wants—the series with the largest positive peak). In other cases, the ranking may want a single value (such as if one wanted to know just the information of the largest positive streak). In that case, the "as_series" parameter would be set to false.

The "filter_attribute" and "filter value" parameters allow the rankings analytic to have greater control for searching through the various analytic results. The filter attribute and value can restrict the search for all analytic results to those that match the specified criteria. As such, rather than having the ranking analytic look at all the various peaks across all series, it will only rank the ones whose "sign" value is equal to "Positive" as specified by the filter attribute and filter value parameters.

The source data under analysis can be tabular data, where the columns are either dimensions or measures. The series in this data can refer to the various measures in the source tabular data. For example, a source chart may be a line chart that plots sales and revenue over time. The source tabular data in this example includes a time dimension, a sales measure, and a revenue measure. Thus, the sales and revenue values over time can be series data for analysis.

Figure 11:
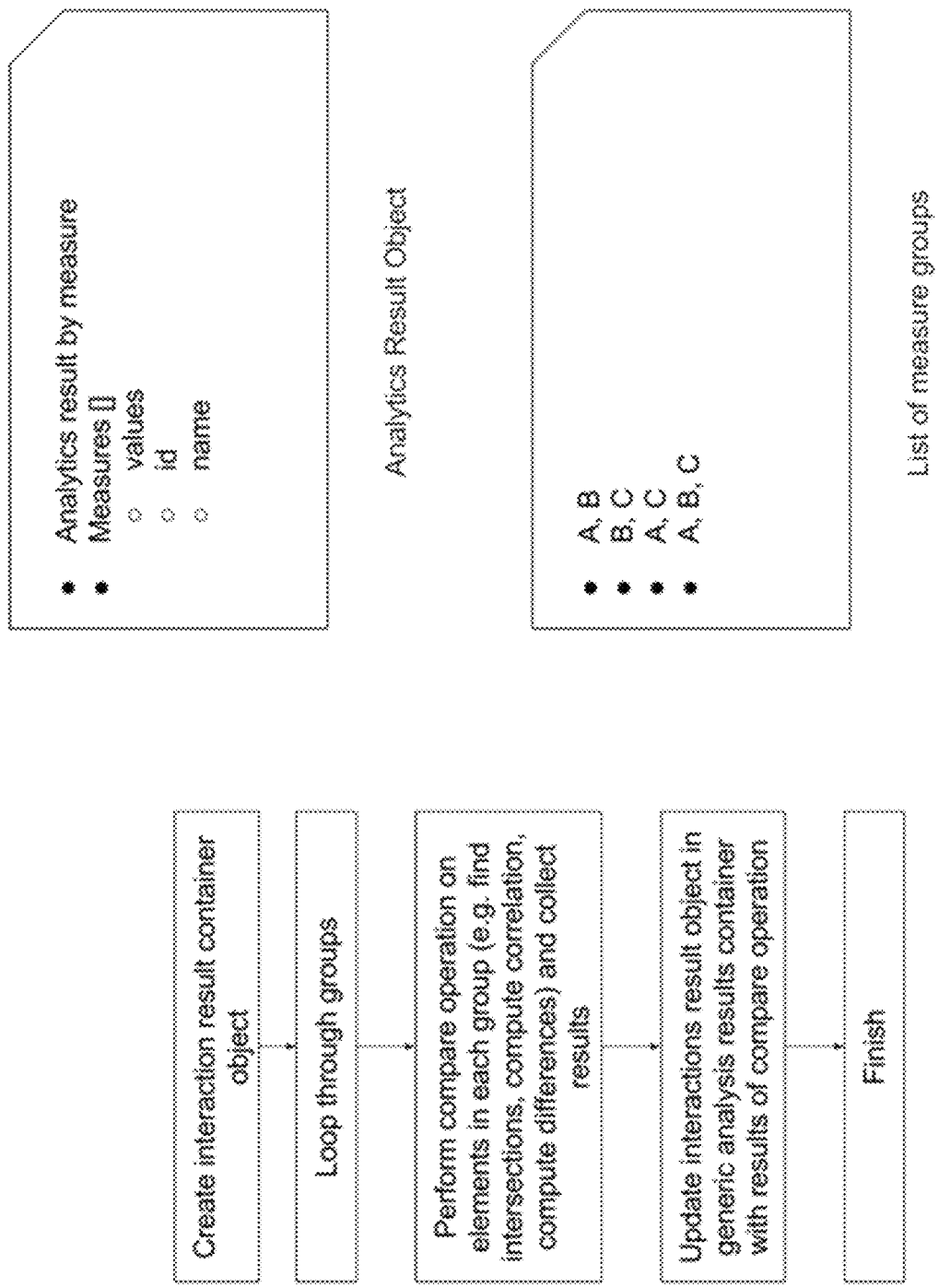
FIG. 11 shows an example process flow for an interactions analytic.

As another example, interactions are another type of analytic that can be included as part of analysis library, and an interactions analytic can be configured to find intersections between data sets. However, it should be understood that the interactions analytic can do more than just find intersections. The interactions analytic can operate on multiple measures, which in practice may include operations such as calculating correlations, finding the intersections between the measure values for continuous data sets, and performing calculations on the series themselves (for example, subtracting one series from another to find the difference). An example process flow for an interactions analytic is shown by FIG. 11. Interactions can be applied to those analytics which use two or more data sets to compute, such as correlation. An interactions analytic can perform steps such as (1) choosing combinations of entities, (2) performing comparisons (e.g., finding intersections, getting correlations, getting differences, etc.), (3) updating compares with reference to analytic results, and (4) trimming/ranking. As an example of an interactions analytic, it may be desirable to find the locations, if any, where three series (A, B, C) converge. The analytic can be configured to by default iterate through pairwise combinations of the series (AB, BC, and AC) and find the intersections within those pairs. If any of these pairs fails to find an intersection (e.g., no intersections are found in the pair AC), then the analytic can stop because the analytic will then know that there are no intersections between all three of the series. This strategy for resolving intersections can greatly reduce computational complexity. Moreover, if desired, such settings could be configurable/over-written.

The inputs for the interactions analytic can be an analysis results container object and a list of groups of measure objects (e.g., pairwise measures A-B, B-C, A-C). As shown by FIG. 11, this process flow creates an interaction result container object which will get populated with results of the interactions analysis. The process flow then loops through the groups, and for each group, it performs comparisons on elements in each group to find intersections, compute correlations, compute differences, etc. and collects results. This operation can have knowledge of the current state of the interactions, and thus has the freedom to abort operations depending on certain conditions (e.g., if no interactions exist for A-C, do not perform the A-B-C intersection comparison operation). Then, the process flow updates the interactions result object with the results of the comparisons.

Some examples of underlying analytics 110 that can be included as part of the analysis service include peaks analytics, jumps analytics, runs analytics, and streaks analytics.

Figure 12:
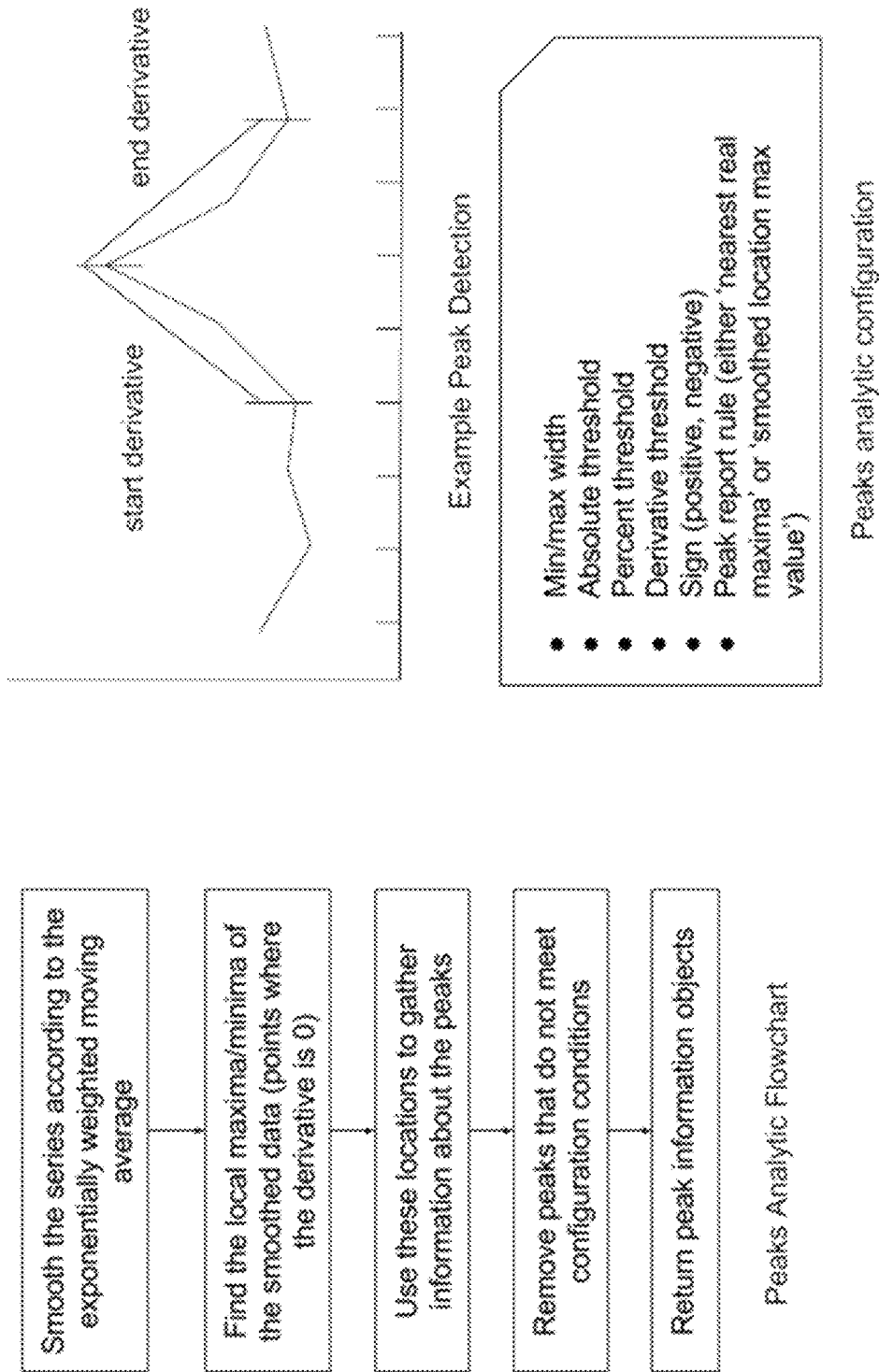
FIG. 12 shows an example process flow for a peaks analytic.

A peaks analytic can be configured to find peaks and troughs within a data set. An example process flow for a peaks analytic is shown by FIG. 12. Peaks and troughs are those features which start at some baseline, move either up or down to some local maxima/minima, then return to that previous baseline. A peaks analytic can identify (1) a baseline value for the data set, (2) absolute and percentage change between the baseline and the peak, (3) locations of the start and end of the peak, (4) the start and end derivatives (which can be the slope of the line made by the values at the first part of the peak and the last part of the peak), and (5) directions of movement between peaks and troughs.

The inputs for the peaks analytic can be the measure values that are to be analyzed to find peaks and the configuration data for the peaks analytic. As shown by FIG. 12, this configuration data can include (1) a min/max width for a peak, (2) a threshold, (3) a percent threshold, (4) a derivative threshold, (5) a sign (or direction, where positive can denote a peak and negative can denote a trough), and (6) a peak report rule (e.g., "nearest real maxima" or "smooth local max value"). As operational steps, the peaks analytic can smooth the series according to the exponentially weighted moving average of the series. Then, the process finds the local maxima/minima of the smoothed data (the points where the derivative is zero). For these local maxima/minima, the analytic gathers information such as their (1) start/end index value, (2) start/end value, (3) width, (4) value at peak (according to configured peak report rule), (5) index value at peak (according to configured peak report rule), (6) start derivative (the slope of the line starting from the start and ending at the center), (7) end derivative (the slope of the line starting from the center and ending at the end), (8) overall derivative (the average of the start derivative and the end derivative), (9) baseline value (the average of the start and end values), (10) change (which can be the height of the peak or the absolute value of the difference between the value at peak and the baseline value), (11) percent change (change divided by baseline value), and (12) score (which can be defined via a function used to give a numeric value to the size of the peak, where the value gets larger for larger changes/percentage changes/derivatives). Next, the analytic can review this information and remove the maxima/minima that do not meet the configuration conditions for the peaks analytic. For example, this step can check that each candidate peak has at least the minimum width, no more than the maximum width/percent change, etc. After this filtering/removal, the remaining peaks and their corresponding data can be returned as information objects.

Figure 13:
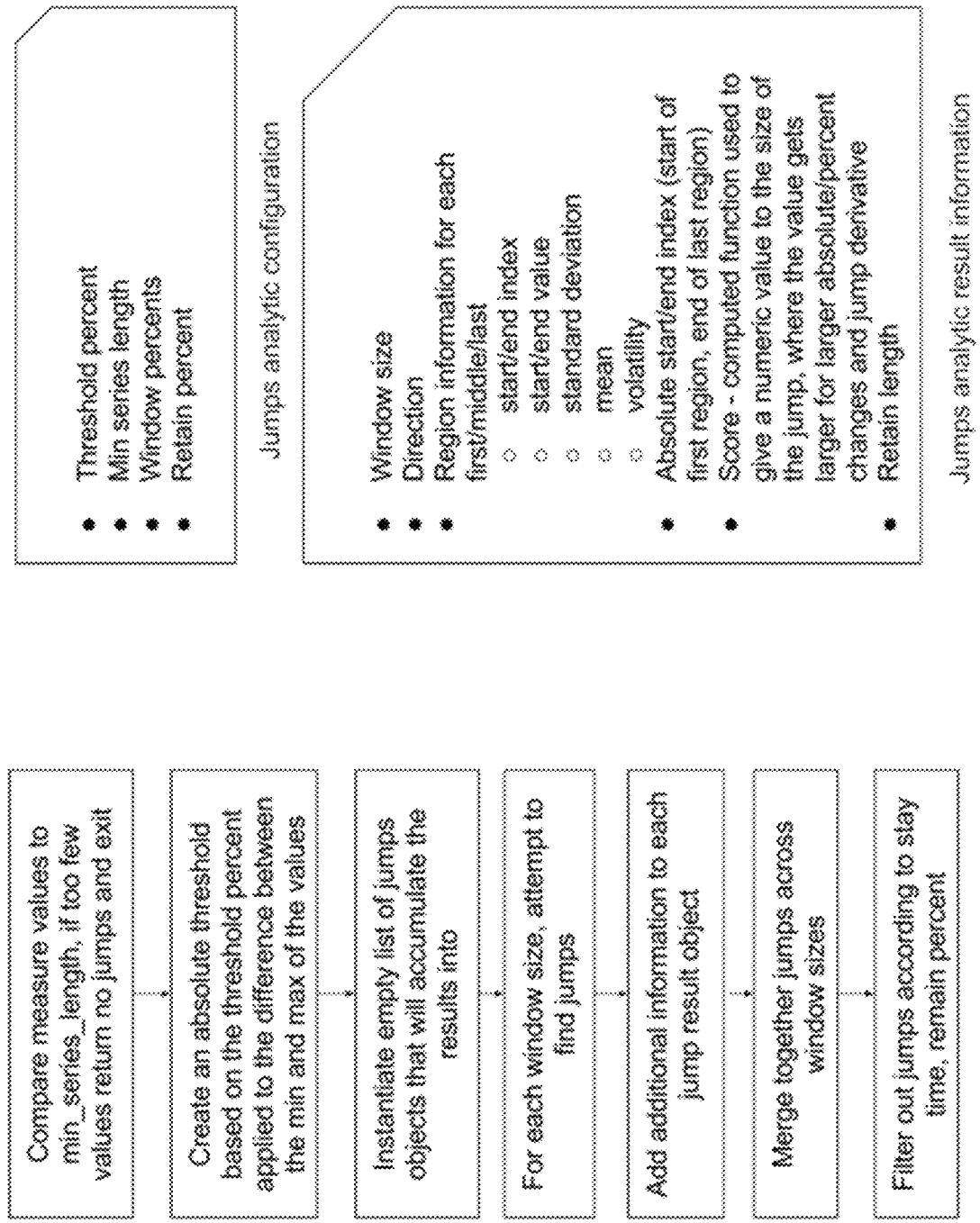
FIG. 13 shows an example process flow for a jumps analytic.

Jumps are similar to peaks except that instead of returning to the baseline at the start of the peak, the series settles at a new baseline. A jump is a region where the value changes relatively quickly to a new value and then (unlike a peak) stays near the new value for a while. An example process flow for a jumps analytic is shown by FIG. 13. The attributes of a jumps analytic can be similar to those for the peaks analytic except includes the finish baseline value and only the one slope.

The inputs for the jumps analytic can be the measure values that are to be analyzed to find jumps and the configuration data for the jumps analytic. As shown by FIG. 13, this configuration data can include (1) a threshold percent, (2) a minimum series length, (3) window percents (which can be a list of percentages to use for searching for jumps, which corresponds to resolutions of jumps, and which by default can include 50 percentages between 0.2 and 0.75), and (4) retain percents (which specify how long the values must stay relatively similar after the jump and which can be expressed as a percent of the total series length). As operational steps, the jumps analytic can first compare the measure values to the minimum series length configuration. If there are too few values in the data, then the analytic would return no jumps and exit execution. Next, the process creates an absolute threshold based on the threshold percent configuration applied to the difference between the min and max of the data values. Then, the process instantiates an empty list of jumps objects in which the process will accumulate results.

Thereafter, the process attempts to find jumps for each window size. It can identify start/end indices of the center (increasing/decreasing) portion of the candidate jump. This can be done by creating a cuts series by applying a rolling function to the values which (1) splits the values into three portions, (2) compares the average of the first third to the average of the second third, and (3) if the difference between those averages is greater than the threshold percent, mark this region as containing a candidate jump. This step can also find the absolute starts/ends of these regions by noting where the cuts difference between one value and the next is not zero.

The process then adds information to each candidate jump result object. Such information can include (1) a window size, (2) a direction, (3) region information for each of the first/middle/last (i) start/end index, (ii) start/end value, (iii) standard deviation, (iv) mean, and (v) volatility, (4) absolute start/end index (start of first region, end of last region), (5) score (which can be computed via a function used to give a numeric value to the size of the jump, where the value gets larger for larger absolute/percentage changes and jump derivative), and (6) retain length (which can be number of contiguous data points that fall into the retain band, counting from the end of the last region).

Thereafter, the process flow merges jumps across windows. It can look through each jump and build up to larger and larger jumps by combining the jump information if the locations of the starts and ends overlap. Next, the analytic can filter out jumps according to the configured stay time (retain percent). From there, the remaining jumps can be returned as jump objects according to scores.

A runs analytic can be configured to find a sub-array within a series (single region) whose summed values gives the largest amount. A positive/negative run can be defined as a contiguous subarray of numbers whose forward differences sum to a global positive/negative maximum. Such a sub-array can be referred to as the maximum value sub-array, and this type of analysis can be useful for describing regions which impacted net growth/decline. For example, for the array [2, 1, 2, 4, 3, 5, 4, 3, 4], the maximum net positive run is [1, 2, 4, 3, 5], and the maximum net negative run is [5, 4, 3] (where the run length is greater than or equal to 2). An example of a narrative story that can express an insight derived from a runs analytic can be:

"Contrasting with the overall decrease, the largest net growth was from March 7 to October 7, when Central Revenue rose by 1.6 million (135%)."

Figure 14:
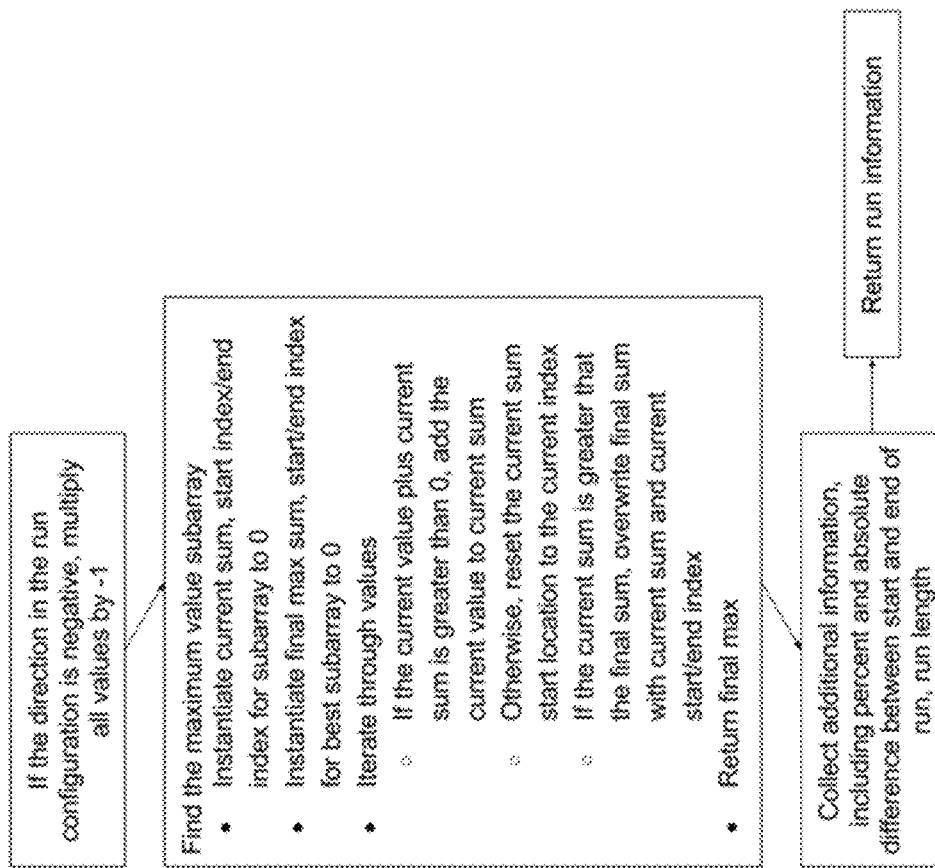
FIG. 14 shows an example process flow for a runs analytic.

FIG. 14 shows an example process flow for a runs analytic. The inputs for the runs analytic can be the measure values that are to be analyzed to find runs and a configured run direction. If the run direction is negative, the analytic multiplies all values by −1. Next, the analytic finds the maximum value subarray. To do so, it can (1) instantiate current sum, start index/end index for subarray to 0, (2) instantiate final max sum, start/end index for the best sub-array to 0, (3) and iterate through the measure values. As part of these iterations, the analytic can (1) if the current value plus the current sum is greater than 0, add the current value to the current sum, (2) otherwise, reset the current sum start location to the current index, and (3) if the current sum is greater than the final sum, overwrite the final sum with the current sum and the current start/end index. After completing the iterations, the analytic returns the final maximum subarray. It then collects additional information about this subarray, such as percent and absolute difference between the start and end of the run, the run length, etc.

A streaks analytic can be configured to find streaks within a data set, where streaks can be defined as consecutively increasing/decreasing/unchanging regions of the data set. For example, given the series [3, 3, 3, 4, 5, 2, −1], there are three streaks present—[3, 3, 3] which is a flat streak, [3, 4, 5] which is a positive streak, and [5, 2, −1] which is a negative streak (where the streak length is greater than or equal to 2). Similar to peaks, a streaks analytic can identify (1) the start/end locations for streaks, (2) absolute and percentage change for start to finish for each streak, (3) the direction of movement for each streak, and (4) the length for each streak. Unlike runs, streaks are consistently increasing/decreasing/unchanging with respect to defined thresholds. Streaks can be thought of in a sports context as being, for example, when a basketball player has made all of his shots taken in a quarter. Runs, on the other hand, would be used to describe the period where the winning team pulled ahead the most.

Figure 15:
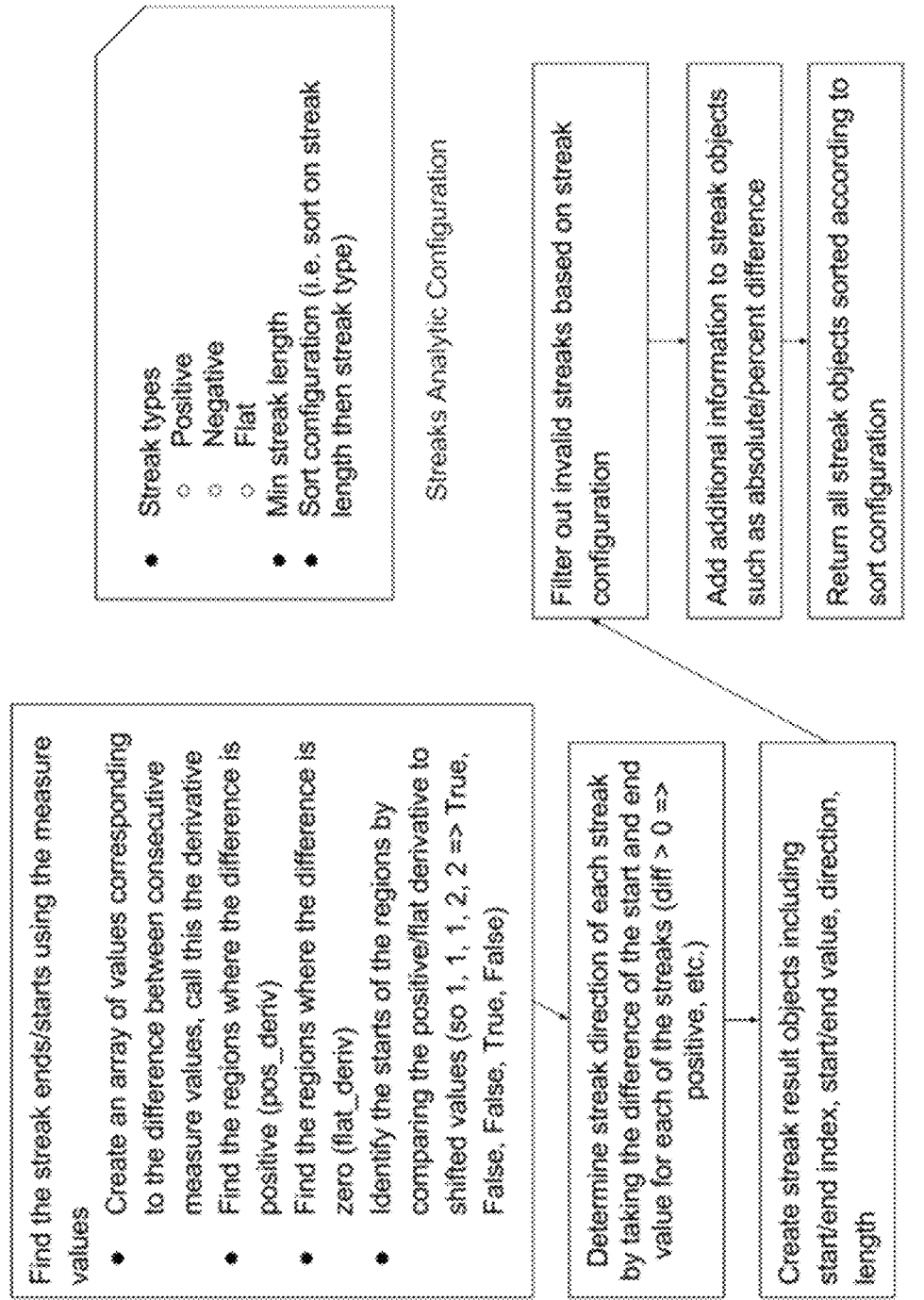
FIG. 15 shows an example process flow for a streaks analytic.

FIG. 15 shows an example process flow for a streaks analytic. The inputs for the streaks analytic can be the measure values that are to be analyzed to find streaks and configuration data for the streaks analytic. The configuration data can be used to control the streaks analytic to only expose streaks of certain types or longer than a certain length. The streaks configuration data can include (1) a streak type (positive, negative, and/or flat), (2) a minimum streak length, and (3) a sort configuration (e.g., sort on streak length then on streak type).

As an operational step, the analytic finds the streak ends/starts using the measure values. This can include (1) creating an array of values corresponding to the difference between consecutive measure values (deriv), (2) finding the regions where the difference is positive (pos_deriv), (3) finding the regions where the difference is zero (flat deriv), and (4) identifying the starts of the regions by comparing the positive/flat derivative to shifted values (so 1, 1, 1, 2, 2, =>True, False, False, True, False).

As a next operational step, the analytic determines streak direction for each streak by taking the difference of the start and end value for each of the streaks (diff>0=>positive, etc.).

As another operational step, the analytic creates streak result objects. These objects can get populated with information such as start/end index, start/end value, direction, and length. Thereafter, the analytic can filter out invalid streaks based on the streak configuration data. For remaining streaks, the analytic can add additional information to the streak objects such as absolute/percent difference information, and then return all streak objects, as sorted according to the sort configuration.

Figure 9:
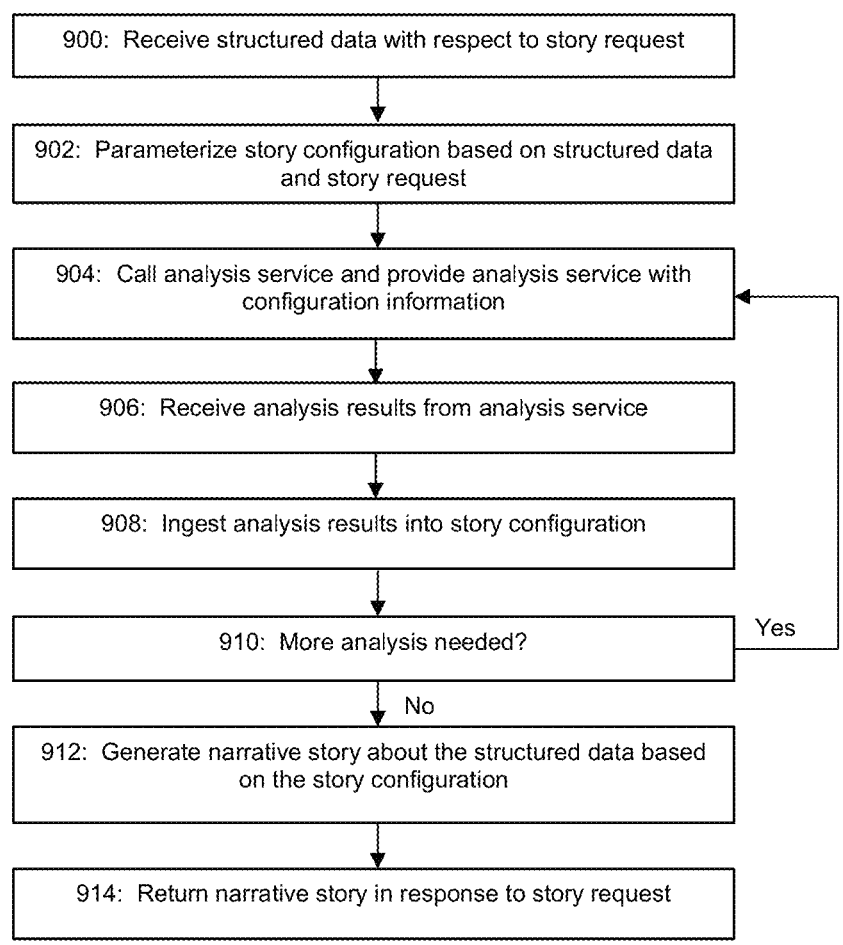
FIG. 9 shows an example process flow for an example embodiment of an authoring service.

FIG. 9 depicts an example process flow for the authoring service 104. At step 900, the authoring service receives structured data with respect to a story request 142. This structured data is the data to be described by the narrative story. Optionally, this structured data may be included as part of the story request 142. At step 902, the authoring service parameterizes a story configuration based on the structured data and the story request 142. Examples of such configurations are described in the above-referenced and incorporated patents and patent applications. For example, the '844 and '178 patents describe a configuration-based approach for narrative generation that employs story specifications and content blocks. As another example, patent application Ser. No. 15/253,385, 15/666,151, 15/666,168 and 15/666,192 describe a configuration-based narrative generation technique in connection with generating narratives from visualization data. As yet another example, the '899, '492, '197, and '009 patents and patent applications 62/460,349, 62/539,832, and 62/585,809 describe a configuration-based approach for narrative generation that employs explicit representations of communication goals to help drive narrative generation.

The authoring service can then process the story configuration to determine that analytics are needed to compute additional data needed for the story generation process, and a call can be made to analysis service 106 via interface 120 for this purpose (step 904). As discussed above, the authoring service can communicate, via interface 120, an analysis request 130 to the analysis service 106, where such an analysis request 130 can includes configuration information for the analysis operations. At step 906, the authoring service receives the analysis results 132 from the analysis service 106 via interface 120. These analysis results are ingested into the story configuration at step 908, and a determination is made as to whether more analysis is needed (step 910). If more analysis is needed, the process flow returns to step 904. Otherwise, the process flow proceeds to step 912. At step 912, a narrative story 144 about the structured data is generated based on the story configuration, and this narrative story 144 can express insights about the structured data that results from the analysis results returned by the analysis service 106. For example, the narrative story might identify the values of the largest peaks in a data set. The above-referenced patents and patent applications describe how narrative stories can be generated from story configurations in this fashion. Lastly, at step 914, the authoring service returns the narrative story 144 to the client 140 in response to the request. This step may involve encoding the narrative story as an HTML document or the like to facilitate presentation via a web page.

Returning to FIGS. 1-3, the computer system 100 may comprise a processor and a memory that are operatively coupled with each other. The computer system may also include additional components such as a network interface. The computer system components can be interconnected with each other in any of a variety of manners (e.g., via a bus, via a network, etc.). The processor may comprise one or more processors such as general-purpose processors (e.g., a single-core or multi-core microprocessor) etc. that are suitable for carrying out the operations described herein. The memory may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory may also be integrated in whole or in part with other components of the system 100. Further, the memory may be local to the processor, but it should be understood that the memory (or portions of the memory) could be remote from the processor (in which case the processor may access such remote memory through a component such as a network interface). The memory may store software programs or instructions that are executed by the processor during operation of the system 100. For example, the memory may store the authoring service 104 and the analysis service 106. Furthermore, it should be understood that the computer system 100 could include multiple processors and memories arranged as a distributed computing architecture. With such an arrangement, analytics that are amenable to parallel execution can be executed in parallel by different compute resources within the distributed computing architecture. Furthermore, if the system 100 is handling a large load of story requests 142, the narrative generation tasks performed by the authoring service and analysis service with respect to the various story requests 142 can be distributed across different processors within the distributed computing architecture. Such an approach can yield lower latency with respect to story production.

While the invention has been described above in relation to its example embodiments, various modifications may be made thereto that still fall within the invention's scope. Such modifications to the invention will be recognizable upon review of the teachings herein.

What is claimed is:

1. An apparatus for applying artificial intelligence to generate a narrative story from structured data, the apparatus comprising:
   a processor and a memory that are operatively coupled with each other and comprise (1) an analysis service and (2) an authoring service, wherein the analysis service includes at least one of a configuration-driven peaks analytic, a configuration-driven jumps analytic, a configuration-driven runs analytic, and/or a configuration-driven streaks analytic;
   wherein the authoring service is segregated from the analysis service through an interface;
   wherein the analysis service is (1) invocable by the authoring service through the interface and (2) configured, in response to invocation by the authoring service through the interface, to (i) generate metadata about the structured data and (ii) communicate the metadata to the authoring service; and
   wherein the authoring service is configured to (1) receive the structured data, (2) invoke the analysis service through the interface at runtime based on the structured data, (3) receive the communicated metadata, and (4) process the structured data and the received metadata in accordance with a story configuration to generate a narrative story that expresses an insight about the structured data based on the received metadata.

2. The apparatus of claim 1 wherein the analysis service includes the configuration-driven peaks analytic.

3. The apparatus of claim 2 wherein the authoring service is further configured to communicate a structured message to the analysis service through the interface to invoke the analysis service.

4. The apparatus of claim 3 wherein the authoring service is further configured to selectively invoke the configuration-driven peaks analytic based on a parameter in the structured message.

5. The apparatus of claim 4 wherein the analysis service further includes at least one of the configuration-driven jumps analytic, the configuration-driven runs analytic, and/or the configuration-driven streaks analytic.

6. The apparatus of claim 1 wherein the analysis service includes the configuration-driven jumps analytic.

7. The apparatus of claim 6 wherein the authoring service is further configured to communicate a structured message to the analysis service through the interface to invoke the analysis service.

8. The apparatus of claim 7 wherein the authoring service is further configured to selectively invoke the configuration-driven jumps analytic based on a parameter in the structured message.

9. The apparatus of claim 8 wherein the analysis service further includes at least one of the configuration-driven peaks analytic, the configuration-driven runs analytic, and/or the configuration-driven streaks analytic.

10. The apparatus of claim 1 wherein the analysis service includes the configuration-driven runs analytic.

11. The apparatus of claim 10 wherein the authoring service is further configured to communicate a structured message to the analysis service through the interface to invoke the analysis service.

12. The apparatus of claim 11 wherein the authoring service is further configured to selectively invoke the configuration-driven runs analytic based on a parameter in the structured message.

13. The apparatus of claim 12 wherein the analysis service further includes at least one of the configuration-driven peaks analytic, the configuration-driven jumps analytic, and/or the configuration-driven streaks analytic.

14. The apparatus of claim 1 wherein the analysis service includes the configuration-driven streaks analytic.

15. The apparatus of claim 14 wherein the authoring service is further configured to communicate a structured message to the analysis service through the interface to invoke the analysis service.

16. The apparatus of claim 15 wherein the authoring service is further configured to selectively invoke the configuration-driven streaks analytic based on a parameter in the structured message.

17. The apparatus of claim 16 wherein the analysis service further includes at least one of the configuration-driven peaks analytic, the configuration-driven jumps analytic, and/or the configuration-driven runs analytic.

18. The apparatus of claim 1 wherein the processor comprises a plurality of processors.

19. An apparatus for applying artificial intelligence to generate a narrative story from structured data, the apparatus comprising:
a processor and a memory that are operatively coupled with each other and comprise (1) an analysis service and (2) an authoring service, wherein the analysis service includes a configuration-driven peaks analytic; and
wherein the authoring service is configured to (1) communicate a structured message to the analysis service to selectively invoke the configuration-driven peaks analytic, wherein the structured message comprises (i) a parameter and (ii) at least a portion of the structured data so that the configuration-driven peaks analytic is selectively invoked based on (i) the structured message parameter and (ii) structured data within the structured message, (2) receive metadata about the structured data from the analysis service, and (3) process the structured data and the received metadata to generate a narrative story that expresses an insight about the structured data based on the received metadata.

20. The apparatus of claim 19 wherein the metadata is derived from an execution of the invoked configuration-driven peaks analytic by the analysis service.

21. An apparatus for applying artificial intelligence to generate a narrative story from structured data, the apparatus comprising:
a processor and a memory that are operatively coupled with each other and comprise (1) an analysis service and (2) an authoring service, wherein the analysis service includes a configuration-driven jumps analytic; and
wherein the authoring service is configured to (1) communicate a structured message to the analysis service to selectively invoke the configuration-driven jumps analytic, wherein the structured message comprises (i) a parameter and (ii) at least a portion of the structured data so that the configuration-driven jumps analytic is selectively invoked based on (i) the structured message parameter and (ii) structured data within the structured message, (2) receive metadata about the structured data from the analysis service, and (3) process the structured data and the received metadata to generate a narrative story that expresses an insight about the structured data based on the received metadata.

22. The apparatus of claim 21 wherein the metadata is derived from an execution of the invoked configuration-driven jumps analytic by the analysis service.

23. An apparatus for applying artificial intelligence to generate a narrative story from structured data, the apparatus comprising:
a processor and a memory that are operatively coupled with each other and comprise (1) an analysis service and (2) an authoring service, wherein the analysis service includes a configuration-driven runs analytic; and
wherein the authoring service is configured to (1) communicate a structured message to the analysis service to selectively invoke the configuration-driven runs analytic, wherein the structured message comprises (i) a parameter and (ii) at least a portion of the structured data so that the configuration-driven runs analytic is selectively invoked based on (i) the structured message parameter and (ii) structured data within the structured message, (2) receive metadata about the structured data from the analysis service, and (3) process the structured data and the received metadata to generate a narrative story that expresses an insight about the structured data based on the received metadata.

24. The apparatus of claim 23 wherein the metadata is derived from an execution of the invoked configuration-driven runs analytic by the analysis service.

25. An apparatus for applying artificial intelligence to generate a narrative story from structured data, the apparatus comprising:
a processor and a memory that are operatively coupled with each other and comprise (1) an analysis service and (2) an authoring service, wherein the analysis service includes a configuration-driven streaks analytic; and
wherein the authoring service is configured to (1) communicate a structured message to the analysis service to selectively invoke the configuration-driven streaks analytic, wherein the structured message comprises (i) a parameter and (ii) at least a portion of the structured data so that the configuration-driven streaks analytic is selectively invoked based on (i) the structured message parameter and (ii) structured data within the structured message, (2) receive metadata about the structured data from the analysis service, and (3) process the structured data and the received metadata to generate a narrative story that expresses an insight about the structured data based on the received metadata.

26. The apparatus of claim 25 wherein the metadata is derived from an execution of the invoked configuration-driven streaks analytic by the analysis service.

27. A method for applying artificial intelligence to generate a narrative story from structured data, the method comprising:
a processor executing an authoring service, wherein the authoring service execution comprises (1) receiving structured data and (2) invoking an analysis service through an interface at runtime based on the structured data, wherein the authoring service is segregated from the analysis service through the interface;
a processor executing the analysis service in response to the invoking, wherein the analysis service (i) processes the structured data to generate metadata about the structured data using at least one of a configuration-driven peaks analytic, a configuration-driven jumps analytic, a configuration-driven runs analytic, and/or a configuration-driven streaks analytic and (ii) communicates the metadata to the authoring service; and wherein the authoring service execution further comprises (1) receiving the communicated metadata and (2) processing the structured data and the received metadata in accordance with a story configuration to generate a narrative story that expresses an insight about the structured data based on the received metadata.

28. The method of claim 27 wherein the analysis service includes the configuration-driven peaks analytic.

29. The method of claim 27 wherein the analysis service includes the configuration-driven jumps analytic.

30. The method of claim 27 wherein the analysis service includes the configuration-driven runs analytic.

31. The method of claim 27 wherein the analysis service includes the configuration-driven streaks analytic.

32. The method of claim 27 wherein the invoking step comprises the authoring service communicating a structured message to the analysis service through the interface to invoke the analysis service.

33. The method of claim 32 wherein the invoking step further comprises selectively invoking a configuration-driven analytic within the analysis service based on a parameter in the structured message.

34. The method of claim 33 wherein the analysis service includes at least two of the configuration-driven peaks analytic, the configuration-driven jumps analytic, the configuration-driven runs analytic, and/or the configuration-driven streaks analytic, and which are selectively invokable via the structured message.

35. A computer program product for applying artificial intelligence to generate a narrative story from structured data, the computer program product comprising:

a plurality of processor-executable instructions that are resident on a non-transitory computer-readable storage medium;

wherein the instructions include a plurality of instructions arranged as an analysis service;

wherein the instructions include another plurality of instructions arranged as an authoring service;

wherein the authoring service instructions are segregated from the analysis service instructions through an interface;

wherein the analysis service instructions are (1) invocable by the authoring service through the interface and (2) configured, in response to invocation by the authoring service through the interface, to (i) process the structured data to generate metadata about the structured data using at least one of a configuration-driven peaks analytic, a configuration-driven jumps analytic, a configuration-driven runs analytic, and/or a configuration-driven streaks analytic and (ii) communicate the metadata to the authoring service; and wherein the authoring service instructions are configured for execution by a processor to cause the processor to (1) receive the structured data, (2) invoke the analysis service through the interface at runtime based on the structured data, (3) receive the communicated metadata, and (4) process the structured data and the received metadata in accordance with a story configuration to generate a narrative story that expresses an insight about the structured data based on the received metadata.

36. The computer program product of claim 35 wherein the authoring service instructions are further configured for execution by the processor to cause the processor to invoke the analysis service by communicating a structured message to the analysis service through the interface.

37. The computer program product of claim 36 wherein the authoring service instructions are further configured for execution by the processor to cause the processor to selectively invoke a configuration-driven analytic within the analysis service based on a parameter in the structured message.

38. The computer program product of claim 37 wherein the analysis service instructions include at least two of the configuration-driven peaks analytic, the configuration-driven jumps analytic, the configuration-driven runs analytic, and/or the configuration-driven streaks analytic, and which are selectively invokable via the structured message.

39. The computer program product of claim 35 wherein the non-transitory computer-readable storage medium comprises a plurality of non-transitory computer-readable storage mediums.

\* \* \* \* \*